(12) United States Patent
Miyamoto et al.

(10) Patent No.: US 12,345,214 B2
(45) Date of Patent: Jul. 1, 2025

(54) INTERNAL COMBUSTION ENGINE CONTROL DEVICE

(71) Applicant: Hitachi Astemo, Ltd., Hitachinaka (JP)

(72) Inventors: Akiyasu Miyamoto, Tokyo (JP); Henning Sauerland, Schwaig-Oberding (DE); Naoki Yoneya, Tokyo (JP); Yoshihito Yasukawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/287,738

(22) PCT Filed: Feb. 15, 2022

(86) PCT No.: PCT/JP2022/005963
§ 371 (c)(1),
(2) Date: Oct. 20, 2023

(87) PCT Pub. No.: WO2023/276245
PCT Pub. Date: Jan. 5, 2023

(65) Prior Publication Data
US 2024/0360797 A1    Oct. 31, 2024

(30) Foreign Application Priority Data

Jun. 28, 2021 (JP) ................. 2021-107110

(51) Int. Cl.
*F02D 19/08* (2006.01)
*F02D 41/04* (2006.01)

(52) U.S. Cl.
CPC .......... *F02D 19/081* (2013.01); *F02D 41/04* (2013.01)

(58) Field of Classification Search
CPC ..... F02D 2041/2055; F02D 2200/0606; F02D 2200/0608; F02D 19/081
(Continued)

(56) References Cited

U.S. PATENT DOCUMENTS

| 2011/0225976 A1* | 9/2011 | Ziminsky | F02C 9/40 60/780 |
| 2015/0226133 A1* | 8/2015 | Minto | F02C 9/48 60/39.27 |
| 2016/0090936 A1* | 3/2016 | Melis | F02D 41/402 123/478 |

FOREIGN PATENT DOCUMENTS

| JP | 2010-164007 A | 7/2010 |
| JP | 2015-75023 A | 4/2015 |
| JP | 2017-2764 A | 1/2017 |

OTHER PUBLICATIONS

International Search Report (PCT/ISA/210) issued in PCT Application No. PCT/JP2022/005963 dated May 10, 2022 with English translation (4 pages).

(Continued)

*Primary Examiner* — Logan M Kraft
*Assistant Examiner* — Joshua Campbell
(74) *Attorney, Agent, or Firm* — Crowell & Moring LLP

(57) ABSTRACT

An internal combustion engine control device includes a valve closing time calculation unit, a valve closing delay time difference calculation unit that normalizes a plurality of valve closing delay times with a fuel pressure and calculates a valve closing delay time difference, a content rate calculation unit that calculates the synthetic fuel content rate of a fuel stored in a fuel tank based on characteristic data indicating the relationship between the valve closing delay time difference and the synthetic fuel content rate of synthetic fuel contained in the fuel, and a combustion control unit that controls an internal combustion engine such that the exhaust temperature of an exhaust gas discharged from a combustion chamber becomes equal to or higher than a threshold temperature based on the synthetic fuel content rate.

6 Claims, 14 Drawing Sheets

(58) Field of Classification Search
USPC .......................................................... 701/104
See application file for complete search history.

(56) References Cited

OTHER PUBLICATIONS

Japanese-language Written Opinion (PCT/ISA/237) issued in PCT Application No. PCT/JP2022/005963 dated May 10, 2022 with English translation (5 pages).

* cited by examiner

INTERNAL COMBUSTION ENGINE CONTROL DEVICE

TECHNICAL FIELD

The present invention relates to an internal combustion engine control device.

BACKGROUND ART

Conventionally, a technique for burning gasoline mixed with alcohol (ethanol) fuel in an internal combustion engine is known.

PTL 1 discloses a technique related to a fuel injection control device that injects gasoline mixed with alcohol fuel. PTL 1 discloses that "the injection amount of the mixed fuel injected by the fuel injection valve by increasing the fuel injection amount in an initial fuel injection period among the divided fuel injection periods as the alcohol concentration detected by the alcohol concentration sensor increases and decreasing the fuel injection amount in a later fuel injection period among the divided periods as the alcohol concentration detected by the alcohol concentration sensor increases."

CITATION LIST

Patent Literature

PTL 1: JP 2015-75023 A

SUMMARY OF INVENTION

Technical Problem

In recent years, it has become possible to obtain a new synthetic fuel that replaces alcohol fuel by synthesizing carbon dioxide using renewable energy. For this reason, there has been a demand for a technique of mixing a synthetic fuel with gasoline and burning the mixed fuel in an internal combustion engine.

Note that the composition of the synthetic fuel is different from the composition of gasoline. For this reason, in an internal combustion engine that burns gasoline mixed with a synthetic fuel, there has been a concern that a harmful component (for example, formaldehyde components) is generated during the combustion of the synthetic fuel. The technique described in Patent Literature 1 has a problem that it is difficult to reduce harmful components that may be generated when the synthetic fuel is combusted. Therefore, if the internal combustion engine cannot burn the synthetic fuel with appropriate control, a specific harmful component (formaldehyde component, acetaldehyde component, or the like) may be generated.

The present invention has been made in view of such a situation, and an object of the present invention is to control an internal combustion engine so as to suppress the generation of harmful components accompanying the combustion of a fuel containing a synthetic fuel.

Solution to Problem

An internal combustion engine control device according to the present invention includes a fuel temperature estimation unit that estimates the fuel temperature of fuel supplied to a combustion chamber, a fuel pressure acquisition unit that acquires a fuel pressure at which a fuel injection device injects fuel, a valve closing time calculation unit that detects that the fuel injection device is closed at a time point when the fuel temperature reaches a designated temperature and calculates a valve closing time of the fuel injection device, a valve closing delay time difference calculation unit that calculates a valve closing delay time required until the valve closing is completed after the fuel injection device in the valve opening state starts to be closed for each of a plurality of designated temperatures on the basis of a plurality of valve closing times calculated at a plurality of different designated temperatures, normalizes the plurality of valve closing delay times calculated for each of the plurality of designated temperatures with the fuel pressure, and calculates the difference between the valve closing delay times, a content rate calculation unit that calculates a synthetic fuel content rate of fuel stored in a fuel storage unit based on characteristic data indicating the relationship between a valve closing delay time difference and the synthetic fuel content rate of the synthetic fuel contained in the fuel, and a combustion control unit that controls an internal combustion engine such that an exhaust temperature of an exhaust gas discharged from a combustion chamber becomes equal to or higher than a threshold temperature based on the synthetic fuel content rate.

Advantageous Effects of Invention

According to the present invention, since the internal combustion engine is controlled such that the exhaust temperature becomes equal to or higher than a threshold temperature based on the synthetic fuel content rate, it is possible to suppress the generation of harmful components at the time of the combustion of the fuel containing the synthetic fuel.

Problems, configurations, and effects other than those described above will be clarified by the following description of embodiments.

DESCRIPTION OF EMBODIMENTS

Figure 1:
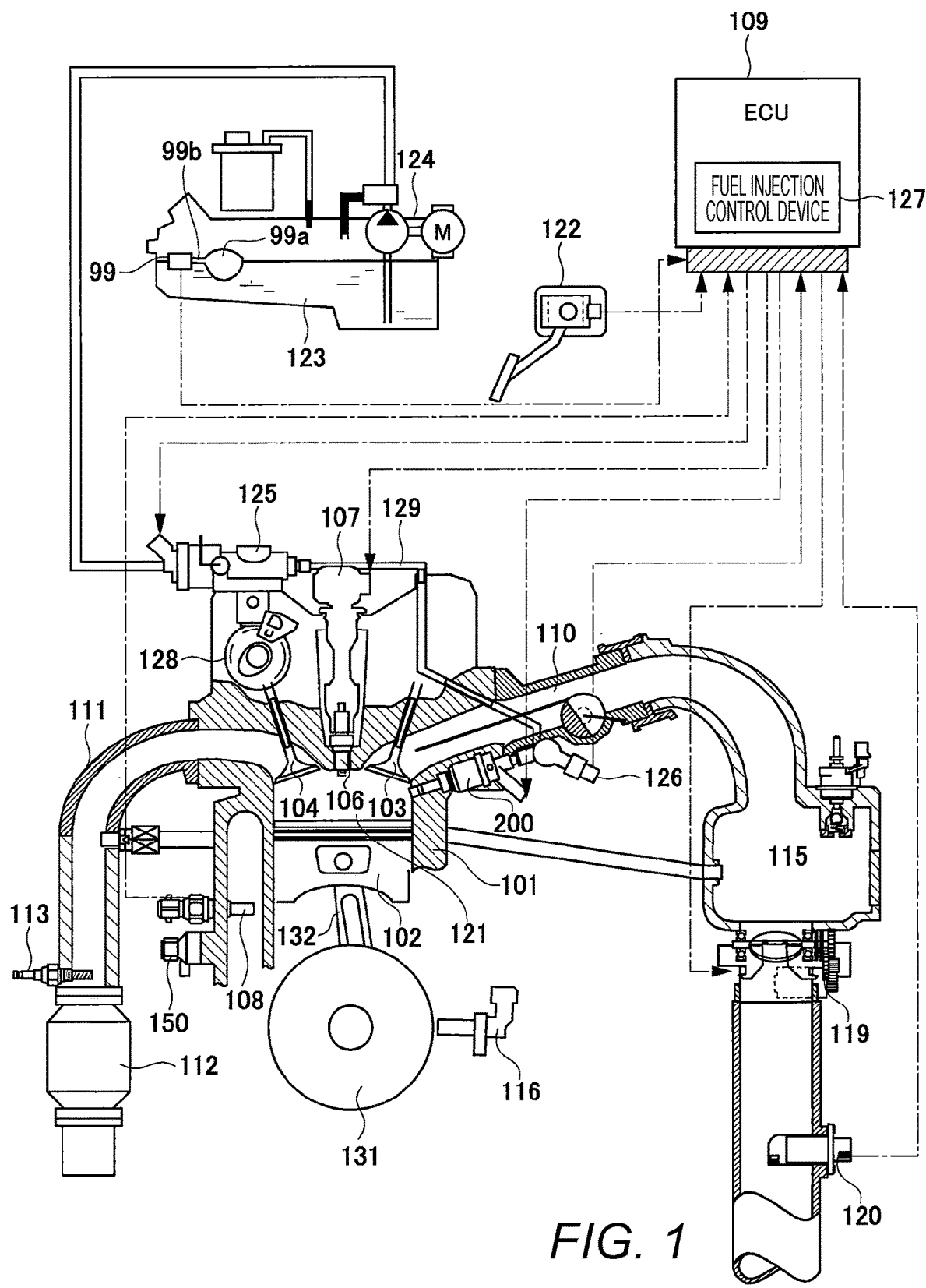
FIG. 1 is an overall configuration diagram of an internal combustion engine system equipped with a fuel injection control device according to a first embodiment of the present invention.

Embodiments for carrying out the present invention will be described below reference to the accompanying drawings. In this specification and the drawings, components having substantially the same function or configuration are denoted by the same reference numerals, and redundant description will be omitted.

First Embodiment

Hereinafter, a fuel injection control device according to a first embodiment of the present invention will be described. Members common to the respective drawings denoted by the same reference numerals.
[Internal Combustion Engine System]
First, a configuration example of an internal combustion engine system equipped with a fuel injection control device according to the present embodiment will be described.

FIG. 1 is an overall configuration diagram of the internal combustion engine system equipped with the fuel injection control device according to the present embodiment.

An internal combustion engine (engine) 101 illustrated in FIG. 1 is a four-cycle engine that repeats four strokes of a suction stroke, a compression stroke, a combustion (expansion) stroke, and an exhaust stroke and is, for example, a multi-cylinder engine including four cylinders. Note that the number of cylinders included in the internal combustion engine 101 is not limited to four, and the internal combustion engine 101 may include six or eight or more cylinders.

The internal combustion engine 101 includes a piston 102, an intake valve 103, and an exhaust valve 104. Intake air (inhale air) to the internal combustion engine 101 passes through an air flow meter (AFM) 120 that detects the amount of air flowing in, and the flow rate is adjusted by a throttle valve 119. The air that has passed through the throttle valve 119 is sucked into a collector 115 that is a branch portion and then supplied to a combustion chamber 121 of each cylinder via an intake pipe 110 and the intake valve 103 provided for each cylinder.

On the other hand, fuel is supplied from a fuel tank 123 to a high-pressure fuel pump 125 by a low-pressure fuel pump 124, and the pressure of the fuel is increased to a pressure necessary for fuel injection by the high-pressure fuel pump 125. That is, the high-pressure fuel pump 125 moves a plunger provided in the high-pressure fuel pump 125 up and down by the power transmitted from an exhaust camshaft (not illustrated) of an exhaust cam 128 and pressurizes (boosts) the fuel in the high-pressure fuel pump 125.

An on-off valve driven by a solenoid is provided in the suction port of the high-pressure fuel pump 125, and the solenoid is connected to a control device (hereinafter, referred to as a "fuel injection control device 127") of a fuel injection device 200 provided in an engine control unit (ECU) 109 which is an example of an engine control device. The fuel injection device (fuel injection device 200) is a direct injection type fuel injection device that directly injects fuel into the combustion chamber (combustion chamber 121).

The fuel injection control device 127 controls a solenoid based on a control command from the ECU 109 and drives the on-off valve so that the pressure (fuel pressure) of the fuel discharged from the high-pressure fuel pump 125 becomes a desired pressure.

The fuel boosted by the high-pressure fuel pump 125 is sent to the fuel injection device 200 via the high-pressure fuel pipe 129. The fuel injection device 200 directly injects fuel into the combustion chamber 121 based on a command from the fuel injection control device 127. The fuel injection device 200 supplies (energizes) a drive current to a coil 208 to be described later, thereby operating a valve body 201 to inject fuel.

The internal combustion engine 101 is provided with a fuel pressure sensor 126 that measures the fuel pressure in a high-pressure fuel pipe 129. The ECU 109 transmits a control command for setting the fuel pressure in the high-pressure fuel pipe 129 to a desired pressure to the fuel injection control device 127 based on the measurement result obtained by the fuel pressure sensor 126. That is, the ECU 109 performs so-called feedback control to set the fuel pressure in the high-pressure fuel pipe 129 to a desired pressure.

Furthermore, each combustion chamber 121 of the internal combustion engine 101 is provided with an ignition plug 106, an ignition coil 107, and a water temperature sensor 108. The ignition plug 106 exposes the electrode portion in the combustion chamber 121 and ignites the air-fuel mixture in which the intake air and the fuel are mixed in the combustion chamber 121 by discharge. The ignition coil 107 generates a high voltage for discharging at the ignition plug 106. The water temperature sensor 108 measures the temperature of cooling water for cooling the cylinder of the internal combustion engine 101.

The ECU 109 performs energization control of the ignition coil 107 and ignition control by the ignition plug 106. The air-fuel mixture in which the intake air and the fuel are mixed in the combustion chamber 121 is burned by a spark emitted from the ignition plug 106, and the piston 102 is pushed down by this pressure.

The exhaust gas generated by the combustion is discharged to an exhaust pipe 111 through the exhaust valve 104. The exhaust pipe 111 is provided with a three-way catalyst 112 and an oxygen sensor 113. The three-way catalyst 112 purifies harmful substances such as nitrogen oxides (NOX) contained in the exhaust gas. The oxygen sensor 113 detects the oxygen concentration contained in the exhaust gas and outputs the detection result to the ECU 109. The ECU 109 performs feedback control based on the detection result obtained by the oxygen sensor 113 so that the fuel injection amount supplied from the fuel injection device 200 becomes the target air-fuel ratio.

A crankshaft 131 is connected to the piston 102 via a connecting rod 132. Then, the reciprocating motion of the piston 102 is converted into a rotational motion by the crankshaft 131. A crank angle sensor 116 is attached to the crankshaft 131. The crank angle sensor 116 detects the rotation and the phase of the crankshaft 131 and outputs the detection result to the ECU 109. The ECU 109 can detect the rotational speed of the internal combustion engine 101 based on an output from the crank angle sensor 116.

Signals supplied from the crank angle sensor 116, the air flow meter 120, the oxygen sensor 113, an accelerator opening sensor 122 indicating the opening of an accelerator operated by a driver, a fuel pressure sensor 126, and the like are input to the ECU 109.

The ECU 109 calculates the required torque of the internal combustion engine 101 based on a signal supplied from the accelerator opening sensor 122 and determines whether or not the engine is in an idle state. Further, the ECU 109 calculates an intake air amount necessary for the internal combustion engine 101 from the required torque and the like and outputs an opening signal corresponding thereto to the throttle valve 119.

In addition, the ECU 109 includes a rotation speed detection unit (not t illustrated) that calculates a rotation speed (hereinafter, referred to as "engine speed") of the internal combustion engine 101 based on the signal supplied from the crank angle sensor 116. Furthermore, the ECU 109 includes a warm-up determination unit (not illustrated) that determines whether the three-way catalyst 112 is in a warm-up state from the temperature of the cooling water obtained from the water temperature sensor 108, the elapsed time after the start of the internal combustion engine 101, and the like.

A fuel level sensor 99 is provided inside the fuel tank 123. The fuel level sensor 99 is for detecting the remaining amount of fuel in the fuel tank 123, and for example, an electric sensor is used. A float (floating element) 99a disposed in the fuel tank 123 is coupled to the electric fuel level sensor 99 via a lever 99b.

Then, the lever 99b moves along with the vertical movement of the float 99a due to the fluctuation of the fuel level (the liquid level height of the fuel) in the fuel tank 123, converts the moving position of the lever 99b into the resistance value of a variable resistance, and outputs an output signal corresponding to the resistance value to the ECU 109. The ECU 109 can detect the fuel level in the fuel tank 123 based on the output signal. The configuration of the fuel level sensor 99 is not limited to the form illustrated in FIG. 1.

The fuel to the fuel tank 123 is given manually or mechanically from the outside of the vehicle. When the fuel tank 123 is filled with fuel, a fuel gauge (not illustrated) is displayed in an analog or digital manner, and the driver can check the remaining fuel in the fuel tank 123.

The fuel supplied to the fuel tank 123 is not necessarily limited to gasoline and is, for example, gasoline containing alcohol. Alternatively, there is also a mixed fuel obtained by mixing alcohol, a synthetic fuel, gasoline, and the like. In addition, the mixing ratios of the respective fuels are not necessarily the same and may vary in various countries, regions, gas stations, and the like. On the other hand, as a method of estimating the synthesis ratios of these fuels, there is also a method using a dedicated sensor, but the method is often reflected in cost. Therefore, an estimation method for accurately grasping the content rates of various fuels contained in gasoline has been desired. Therefore, the fuel injection control device 127 according to the present embodiment provides a method for estimating a synthetic fuel content rate α for accurately grasping the content rate of the synthetic fuel with respect to the total fuel.

The fuel injection control device 127 calculates a fuel amount (target injection amount) corresponding to the intake air amount and outputs a fuel injection signal corresponding thereto to the fuel injection device 200. The target injection amount is fed back to the fuel injection control device 127 based on the oxygen concentration measured by the oxygen sensor 113. Further, the fuel injection control device 127 outputs an energization signal to the ignition coil 107 and outputs an ignition signal to the ignition plug 106.

Next, a detailed configuration example of the fuel injection device 200 illustrated in FIG. 1 will be described with reference to FIG. 2.

Figure 2:
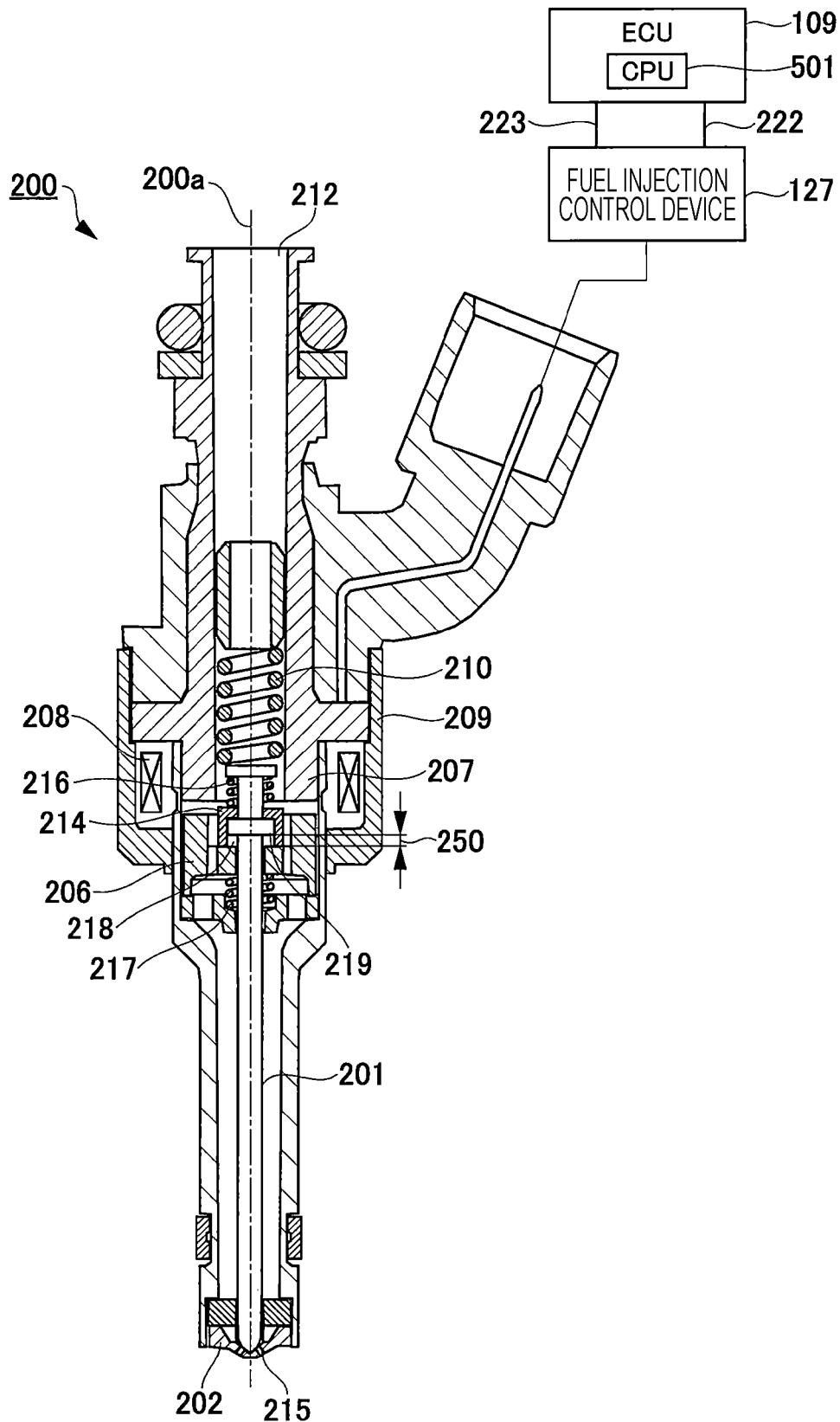
FIG. 2 is a cross-sectional view illustrating an internal configuration example of the fuel injection device according to the first embodiment of the present invention.

FIG. 2 is a cross-sectional view illustrating an internal configuration example of the fuel injection device 200.

As shown in FIG. 2, the fuel injection device 200 includes a fuel supply portion 212 for supplying fuel, a valve seat 202 having a fuel injection hole 215 serving as a fuel passage, and a movable iron core (movable element) 206 for driving a valve body 201. The embodiment present will exemplify an electromagnetic fuel injection device for an internal combustion engine using gasoline or a mixed fuel as a fuel.

In the fuel injection device 200, the fuel supply portion 212 is formed on the upper end side in the drawing, and the fuel injection hole 215 and the valve seat 202 are formed on the lower end side. The movable iron core 206, the valve body 201, and an intermediate member 214 are disposed between the fuel supply portion 212 and the valve seat 202.

An end portion of the fuel injection device 200 which is located on the opposite side (on the fuel supply portion 212 side) to the fuel injection hole 215 and the valve seat 202 is coupled to a high-pressure fuel pipe 129 (not illustrated) (see FIG. 1). The end portion of the fuel injection device 200 which is located on the opposite side (fuel injection hole 215 side) with respect to the fuel supply portion 212 is inserted into an attachment hole (insertion hole) formed in a member (cylinder block, cylinder head, and the like) forming the combustion chamber 121 (see FIG. 1).

The fuel injection device 200 receives the supply of fuel from the high-pressure fuel pipe 129 (see FIG. 1) through the fuel supply portion 212 and injects the fuel from the distal end portion of the valve seat 202 into the combustion chamber 121 (see FIG. 1). Inside the fuel injection device 200, a fuel passage is formed to make fuel flow, from the proximal end portion on the fuel supply portion 212 side to the distal end portion on the fuel injection hole 215 side, substantially along a central axis 200a of the fuel injection device 200.

The coil 208 is disposed between a fixed iron core (stator) 207 and a housing 209. The fixed iron core 207, the coil 208, and the housing 209 constitute an electromagnet. In the valve closed state in which the coil 208 is not energized, the valve body 201 is in contact with the valve seat 202 with the force obtained by subtracting the urging force of a third spring member 217 from the urging force of a first spring member 210 and a second spring member 216 that urge the valve body 201 in the valve closing direction. This state is defined as a valve closing stable state (valve closing standby state). In the valve closed stable state, the movable iron core 206 is in contact with the intermediate member 214 and is placed at the valve closed position. The valve body 201 is driven via a transmission surface 219 that transmits a load from the movable iron core 206.

In the valve closed stable state, the intermediate member 214 is urged to the downstream side (the valve seat 202 side and the valve closing direction) by the second spring member 216, is in contact with the valve body 201, and is stationary. The movable iron core 206 is urged to the upstream side (a fixed iron core 207 side and the valve opening direction) by the third spring member 217, and is in contact with the intermediate member 214. Since the urging force of the second spring member 216 is larger than the urging force of the third spring member 217, a gap 250 is formed between the valve body 201 and the movable iron core 206.

The fuel injection control device 127 and the ECU 109 are connected to the fuel injection device 200. The ECU 109 includes a central processing unit (CPU) 501 illustrated in FIG. 3 to be described later. The fuel injection control device 127 includes a circuit that receives a drive command pulse from the ECU 109 and applies a drive current (drive voltage) to the fuel injection device 200. The ECU 109 and the fuel injection control device 127 may be configured as an integrated component. At least the fuel injection control device 127 is a device that generates a drive voltage for the fuel injection device 200 and may be integrated with the ECU 109 or may be configured as a single device.

The ECU 109 takes in signals indicating the state of the internal combustion engine 101 from various sensors and calculates an appropriate drive command pulse width and injection timing in accordance with the operating conditions of the internal combustion engine 101. The drive command pulse output from the ECU 109 is input to the fuel injection control device 127 through a signal line 223.

The fuel injection control device 127 controls the drive voltage applied to the coil 208 and supplies a drive current. The ECU 109 communicates with the fuel injection control device 127 through a communication line 222 and can switch the drive current generated by the fuel injection control device 127 according to the pressure of the fuel supplied to the fuel injection device 200 and operating conditions. The fuel injection control device 127 can change a control constant by communication with the ECU 109, and a current waveform changes according to the control constant.

[Configuration of Fuel Injection Control Device]

Next, the configuration of the fuel injection control device 127 will be described with reference to FIG. 3.

Figure 3:
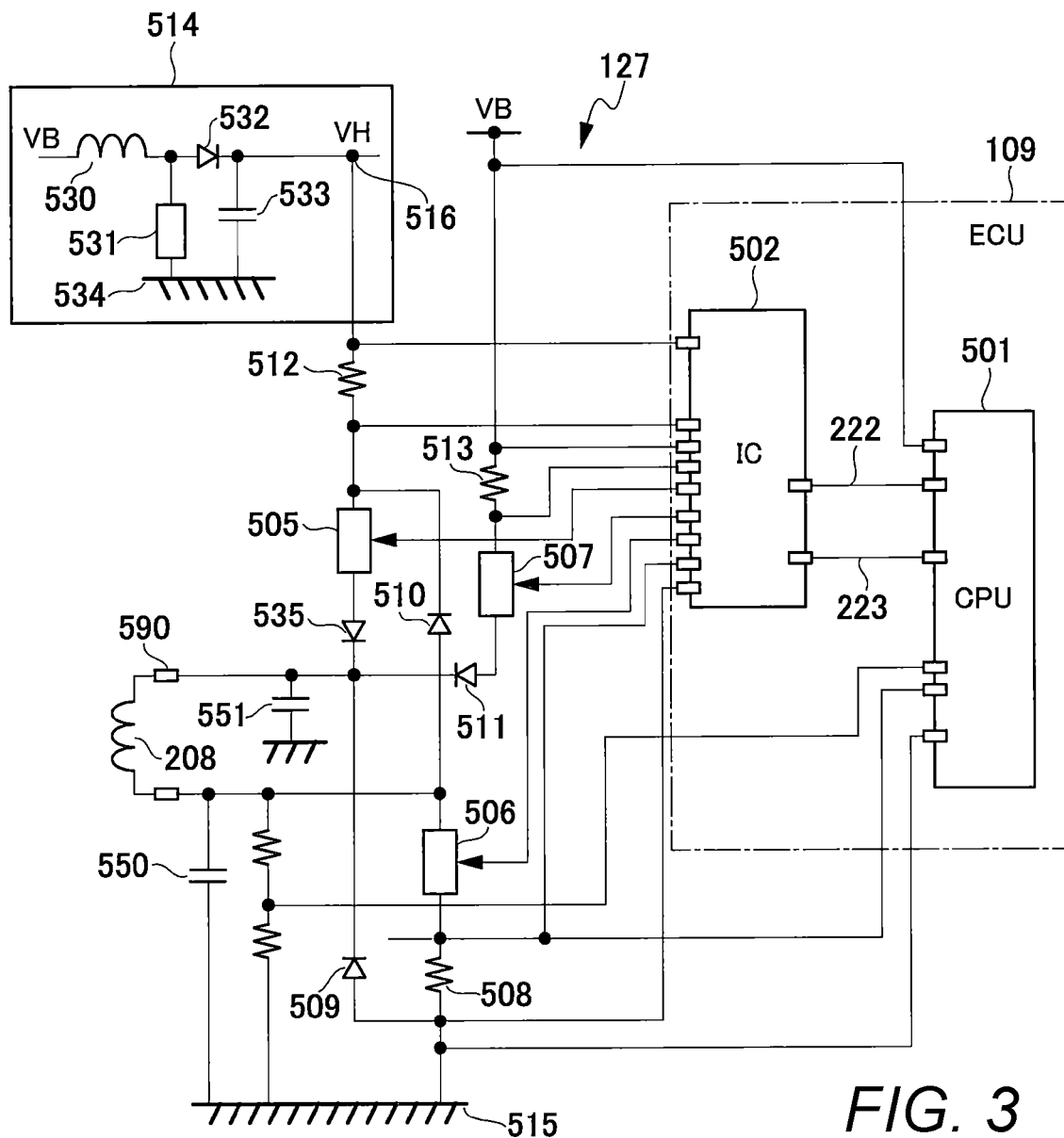
FIG. 3 is a diagram illustrating a detailed configuration example of a drive circuit and an ECU of the fuel injection control device according to the first embodiment of the present invention.

FIG. 3 is a diagram illustrating a detailed configuration example of the drive circuit and the ECU 109 of the fuel injection control device 127.

A CPU 501 built in the ECU 109 takes in various signals indicating the state of the engine from the fuel pressure sensor 126, the air flow meter 120, the oxygen sensor 113, the crank angle sensor 116, and the like. In accordance with these signals, the CPU 501 calculates the widths and injection timings of drive command pulses for controlling the amount of fuel injected from the fuel injection device 200 according to the operating conditions of the internal combustion engine 101.

The CPU 501 calculates the pulse width of an appropriate drive command pulse and an injection timing in accordance with the operating conditions of the internal combustion engine 101 and outputs the drive command pulse to a drive integrated circuit (IC) 502 (described as "IC" in FIG. 3) of the fuel injection device 200 through the signal line 223. The magnitude of the injection amount is determined by the magnitude of the pulse width of the drive command pulse. After that, the drive IC 502 switches between energization and de-energization of switching elements 505, 506, and 507 to supply a drive current to the fuel injection device 200.

The switching element 505 is connected between a high-voltage source higher than a voltage source VB input to the drive circuit of the fuel injection control device 127 and a terminal on the high-voltage side of the coil 208 of the fuel injection device 200. The switching elements 505, 506, and 507 are configured by, for example, FETs (field effect transistors), transistors, and the like, and can switch between energization and de-energization of the fuel injection device 200.

A boost voltage VH, which is the initial voltage value of the high-voltage source, is, for example, 65 V and is generated by boosting the battery voltage by a boost circuit 514. The boost circuit 514 includes, for example, a coil 530, a transistor 531, a diode 532, and a capacitor 533.

In the boost circuit 514, when the transistor 531 is turned on, the battery voltage VB flows to the ground potential 534 side. On the other hand, when the transistor 531 is turned off, the high voltage generated in the coil 530 is rectified through the diode 532, and charges are accumulated in the capacitor 533. This transistor is repeatedly turned on and off until the boost voltage VH is obtained, and the voltage of the capacitor 533 is increased. The transistor 531 is connected to the IC 502 or the CPU 501 and configured such that the boost voltage VH output from the boost circuit 514 is detected by the IC 502 or the CPU 501. Note that the boost circuit 514 may include a DC/DC converter or the like.

The switching element 507 is connected between the low-voltage source and the high-voltage terminal of the coil 208. The low voltage source VB is, for example, a battery voltage, whose voltage value is about 12 V to 14 V. The switching element 506 is connected between the low voltage terminal of the fuel injection device 200 and a ground potential 515.

The drive IC 502 detects current values flowing through the fuel injection device 200 by current detection resistors 508, 512, and 513, and switches between energization and de-energization of the switching elements 505, 506, and 507 in accordance with detected current values, thereby producing desired drive currents. Diodes 509 and 510 apply a reverse voltage to the coil 208 of the fuel injection device 200 to rapidly reduce the current being supplied to the coil 208.

The CPU 501 communicates with the drive IC 502 through a communication line 222, and can switch the drive current generated by the drive IC 502 depending on the pressure of the fuel supplied to the fuel injection device 200 and the operating conditions. Further, both ends of the resistors 508, 512, and 513 are connected to the A/D conversion port of the drive IC 502, and the voltage applied to both ends of the resistors 508, 512, and 513 can be detected by the drive IC 502.

[Operation of Fuel Injection Device]

Next, the operation of the fuel injection device 200 under the control of the fuel injection control device 127 will be described with reference to FIG. 4.

Figure 4:
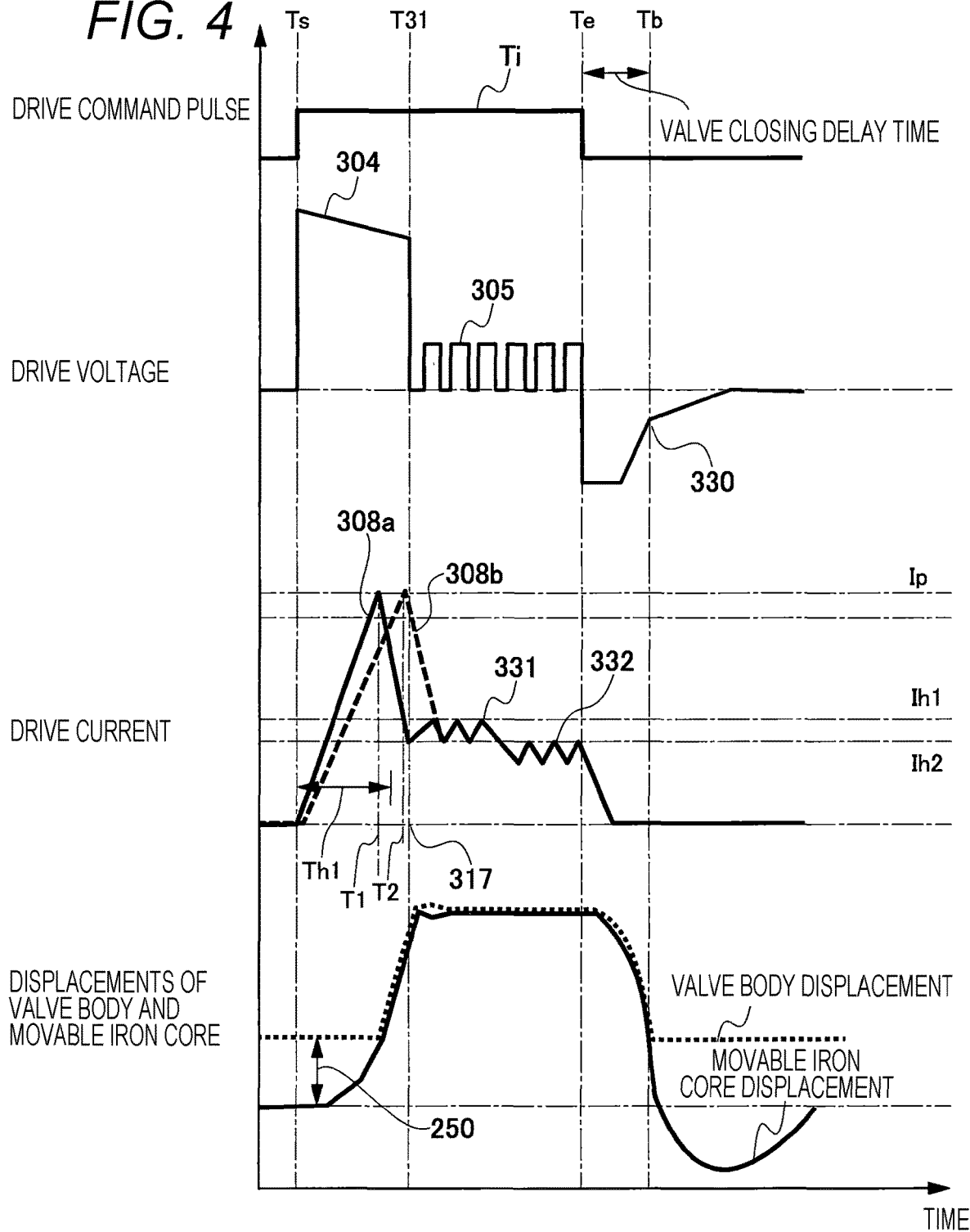
FIG. 4 is a graph illustrating a drive command pulse, a drive voltage, a drive current, a valve body displacement, and the displacement of a movable iron core according to the first embodiment of the present invention.

FIG. 4 is a diagram illustrating a drive command pulse, a drive voltage, a drive current, a valve body displacement, and a displacement of a movable iron core.

As illustrated in FIG. 4, when the drive command pulse Ti is input at time Ts, the drive voltage 304 is applied from the high-voltage source boosted to a voltage higher than the battery voltage VB, and the supply of the current to the coil 208 (see FIG. 2) is started.

After the coil 208 is energized, a magnetomotive force is generated by the electromagnet configured by the fixed iron core 207, the coil 208, and a housing 209. This magnetomotive force makes a magnetic flux flow around the magnetic path formed by the fixed iron core 207, the housing 209, and the movable iron core 206 so as to surround the coil 208. At this time, a magnetic attraction force acts between the movable iron core 206 and the fixed iron core 207, and the movable iron core 206 and the intermediate member 214 are displaced toward the fixed iron core 207. After that, the movable iron core 206 is displaced until the transmission surface 219 of the valve body 201 and a transmission surface 218 of the movable iron core 206 come into contact with each other. The valve body 201 continues to maintain the contact state with the valve seat 202.

When the movable iron core 206 is displaced by the gap 250 formed between the valve body 201 and the movable iron core 206 and the transmission surface 219 of the valve body 201 collides with the transmission surface 218 of the movable iron core 206, the valve body 201 is pulled upstream by the energy of the iron core 206 and separated from the valve seat 202. As a result, a gap is formed in the valve seat portion, a fuel passage is opened, and fuel is injected from the fuel injection hole 215. The valve body 201 is steeply displaced by the movable iron core 206 having kinetic energy.

The fuel injection control device 127 applies a high drive voltage 304 and causes a drive current 308 to flow to the coil 208 from time Ts to time T31 (valve opening start timing) at which the movable iron core 206 and the valve body 201 collide and the valve body 201 separates from the valve seat 202. As a result, a necessary and sufficient magnetic attraction force is generated between the movable iron core 206 and the fixed iron core 207, and the movable iron core 206 can be caused to respond quickly. By causing the movable iron core 206 to respond quickly, for example, even if the gap 250 serving as the preliminary stroke varies for each individual, the influence of the variation on the injection amount can be reduced.

The fuel injection control device 127 according to the present embodiment sets the drive voltage 304 so that the drive current reaches a peak current value Ip at the valve opening start timing and turns off the voltage when the drive current reaches the peak current value Ip. FIG. 4 illustrates a state in which the voltage is turned off when a peak current 308*b* reaches the peak current value Ip. As described above, the fuel injection control device 127 can turn off the voltage at the timing when the excessive acceleration of the movable iron core 206 can be suppressed. The application time of the drive current until reaching the peak current value Ip according to the present embodiment may be determined based on the valve opening start timing. For example, when the magnetic attraction force generated by the valve opening start timing is weak, the fuel injection control device 127 may cause the drive current to reach the peak current value Ip after the valve opening start timing. The fuel injection control device 127 may apply a reverse voltage when the drive current reaches the peak current value Ip.

After time T31, the drive voltage 304 rapidly decreases, so that a drive current 317 indicated by the broken line decreases, and the magnetic attraction force acting between the movable iron core 206 and the fixed iron core 207 decreases. Due to the decrease in the magnetic attraction force, excessive acceleration of the movable iron core 206 is suppressed, and collision energy at the time of collision with the fixed iron core 207 can be reduced. That is, the fuel injection control device 127 suppresses excessive acceleration of the movable iron core 206 by applying a reverse voltage before the movable iron core 206 collides with the fixed iron core 207 and reduces collision energy when the movable iron core 206 collides with the fixed iron core 207.

After the collision between the movable iron core 206 and the fixed iron core 207, the valve body 201 is displaced to the upstream side, and the movable iron core 206 is displaced downward. When the fixed iron core 207 and the movable iron core 206 collide with each other, the valve body 201 and the movable iron core 206 are separated from each other, and the movable iron core 206 is displaced to the downstream side. The movable iron core 206 eventually becomes stationary and stable at a target lift position. This state is defined as a valve opening stable state.

After the high drive voltage 304 is applied, when the drive current reaches a first current value Ih1 that can hold the valve opened, the fuel injection control device 127 continues the application of the drive voltage 305 that repeats the application of the battery voltage VB and the application of 0 V until time Te. Then, the fuel injection control device 127 performs control to maintain the first current value Ih1 and causes a first hold current 331 to flow.

The fuel injection control device 127 holds the first hold current 331 until a predetermined time elapses and then decreases the current value. When the second current value Ih2 that can hold the valve opened is reached, the fuel injection control device 127 performs control to apply the drive voltage 305 that repeats the application of the battery voltage VB and the application of 0 V and causes a second hold current 332 (drive current) to flow so as to maintain the second current value Ih2. The predetermined time is set according to, for example, the time until the magnetic flux is saturated. The first hold current 331 and the second hold current 332 are drive currents for maintaining a state in which the valve body 201 is opened (valve opening hold state).

Subsequently, when the drive command pulse Ti is turned off at time Te, the fuel injection control device 127 applies a drive voltage in the reverse direction (that is, a reverse voltage is applied.). As a result, the current supply to the coil 208 is cut off, the magnetic flux generated in the magnetic circuit disappears, and the magnetic attraction force disappears. As a result, the movable iron core 206 that has lost the magnetic attraction force is pushed back to the closed position where the valve body 201 contacts the valve seat 202 by the load of the first spring member 210 and the force originating from the fuel pressure.

The biasing force of the first spring member 210 acting on the valve body 201 is transmitted to the movable iron core 206 via the transmission surface 219 on the valve body 201 side and the transmission surface 218 on the movable iron core 206 side. When the required valve closing time from time Te when the drive command pulse Ti is turned off to time Tb when the valve closing is completed elapses, the valve body 201 comes into contact with the valve seat 202 at time Tb. The time taken from when the drive current is cut off until the valve body 201 actually comes into contact with the valve seat 202 is referred to as "valve closing delay time". The valve closing delay time is represented by a valve closing required time obtained by subtracting time Te from time Tb and is also described as a valve closing delay time (Tb−Te).

After the valve body 201 comes into contact with the valve seat 202, the transmission surface 218 on the movable iron core 206 side separates from the transmission surface 219 on the valve body 201 side and continues to move in the downward direction (valve closing direction). After time tb at which the valve closing is completed, the movable iron core 206 and the valve body 201 are separated from each other as indicated in FIG. 2. At this time, as indicated by an inflection point 330, the drive voltage changes like bending. The fuel injection control device 127 can detect time Tb at which the valve closing is completed by this change.

When the fuel injection device 200 is closed, when the valve body 201 collides with the valve seat 202, the third spring member 217 turns from extension to compression, and the movement direction of the movable iron core 206 is reversed. As a result, the acceleration of the movable iron core 206 changes, and the inductance of the coil 208 changes. That is, when the fuel injection device 200 is closed, the drive current flowing through the coil 208 is blocked, and the counter electromotive force is applied to the coil 208. Then, since the counter electromotive force gradually decreases as the drive current converges, the inductance changes when the counter electromotive force decreases, and an inflection point 330 occurs in the drive voltage.

The inflection point 330 described above represents the valve closing timing of the fuel injection device 200. The inflection point 330 appears as an extreme value (maximum value or minimum value) when the time-series data of the drive voltage applied to the coil 208 is second-order differentiated. Therefore, the fuel injection control device 127 can specify the inflection point 330 by detecting the extreme value of the time-series data of the drive voltage.

Next, an internal configuration example of the ECU 109 and the fuel injection control device 127 according to the present embodiment will be described with reference to FIG. 5.

Figure 5:
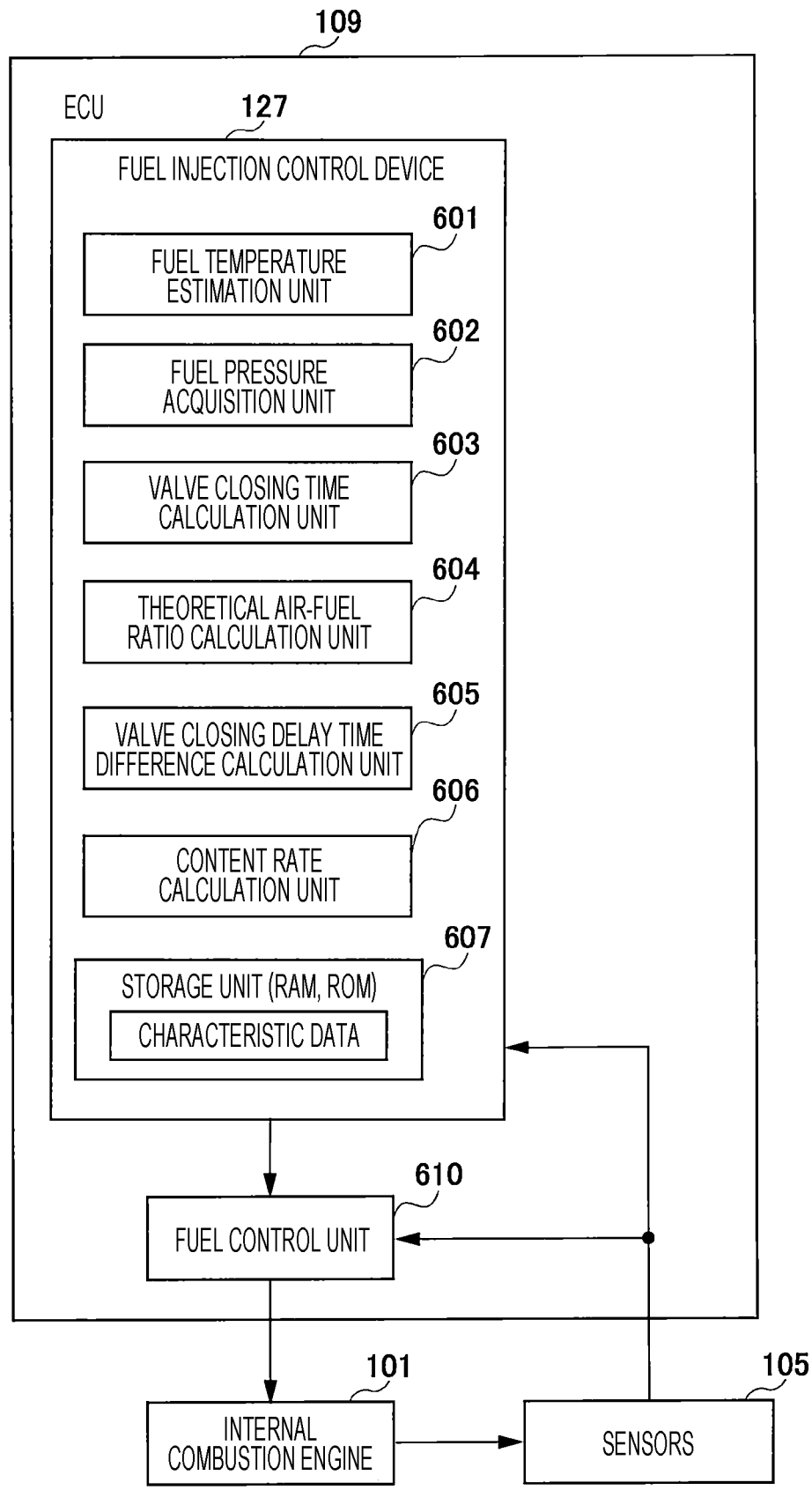
FIG. 5 is a block diagram illustrating a functional configuration example of an ECU and a fuel injection control device according to the first embodiment of the present invention.

FIG. 5 is a block diagram illustrating a functional configuration example of the ECU 109 and the fuel injection control device 127.

The fuel injection control device 127 performs a process of determining whether alcohol fuel or synthetic fuel is contained in fuel (for example, gasoline) stored in the fuel tank 123 at a timing when the internal combustion engine 101 starts to be driven after fuel is supplied to the fuel tank 123.

The ECU 109 includes a combustion control unit 610 in addition to the fuel injection control device 127.

The combustion control unit (combustion control unit 610) controls the internal combustion engine (internal combustion engine 101) such that the exhaust temperature of the exhaust gas discharged from the combustion chamber (combustion chamber 121) becomes equal to or higher than the threshold temperature based on the synthetic fuel content rate α calculated by the fuel injection control device 127. At this time, the combustion control unit 610 outputs an ignition signal for controlling the combustion timing to the internal combustion engine 101. The ignition plug 106 (see FIG. 1) of the internal combustion engine 101 ignites fuel based on an input ignition signal.

Various states of the internal combustion engine 101 are detected by sensors 105. The sensors 105 collectively refer to various sensors (fuel pressure sensor 126, water temperature sensor 108, crank angle sensor 116, and the like) provided in the internal combustion engine 101 illustrated in FIG. 1. The detection results obtained by the sensors 105 are input to the fuel injection control device 127 and the combustion control unit 610. Then, the fuel injection control device 127 and the combustion control unit 610 perform predetermined processing based on the detection results input from the sensors 105.

The fuel injection control device 127 includes a fuel temperature estimation unit 601, a fuel pressure acquisition unit 602, a valve closing time calculation unit 603, a theoretical air-fuel ratio calculation unit 604, a valve closing delay time difference calculation unit 605, a content rate calculation unit 606, and a storage unit 607. The details of the operation of each unit of the fuel injection control device 127 will be described with reference to FIG. 6 and subsequent drawings.

The fuel temperature estimation unit (fuel temperature estimation unit 601) estimates the fuel temperature of fuel supplied to the combustion chamber (combustion chamber 121). The fuel temperature is the temperature of the fuel injected by the fuel injection device 200. Then, the fuel temperature estimation unit (fuel temperature estimation unit 601) estimates a fuel temperature based on the waveform of the drive current for driving the fuel injection device (fuel injection device 200) in which the resistance of the coil (coil 208) built in the fuel injection device (fuel injection device 200) changes with a change in fuel temperature.

The fuel pressure acquisition unit (fuel pressure acquisition unit 602) acquires a fuel pressure at which the fuel injection device (fuel injection device 200) injects fuel. For example, the fuel pressure acquisition unit 602 acquires the fuel pressure detected by the fuel pressure sensor 126.

The valve closing time calculation unit (valve closing time calculation unit 603) detects that the fuel injection device (fuel injection device 200) is closed when the fuel temperature reaches the designated temperature and calculates the valve closing time of the fuel injection device (fuel injection device 200). In the present embodiment, two designated temperatures are provided.

Figure 10:
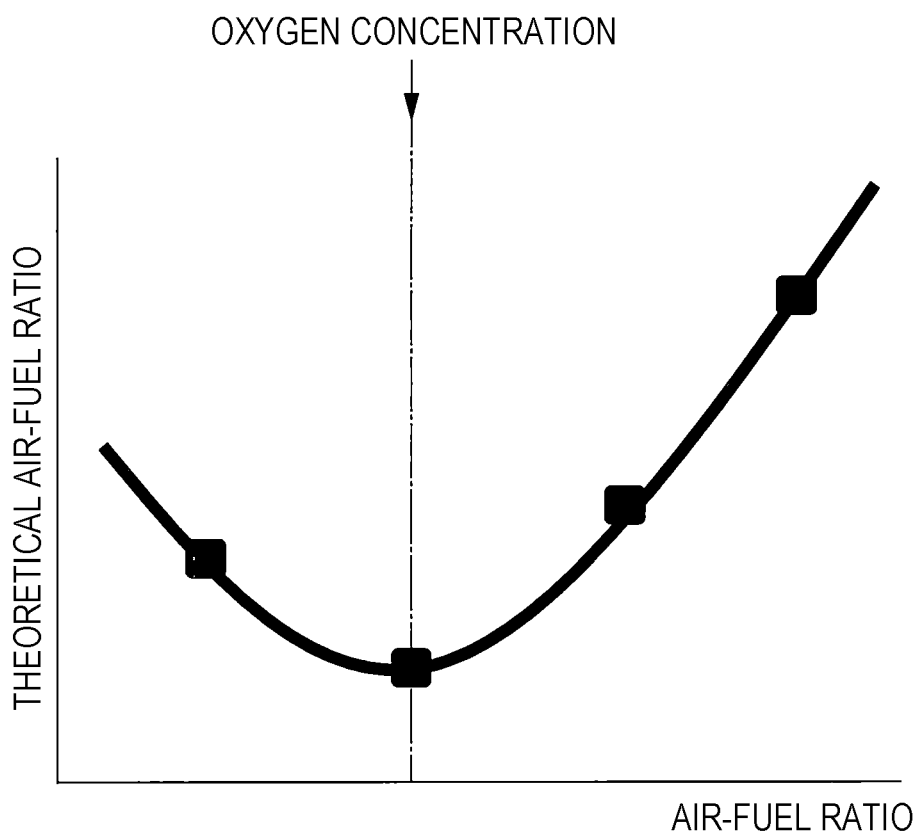
FIG. 10 is a graph illustrating the relationship between an oxygen concentration an air-fuel ratio according to the first embodiment of the present invention.

The theoretical air-fuel ratio calculation unit (theoretical air-fuel ratio calculation unit 604) calculates a theoretical air-fuel ratio during the combustion of the fuel including the synthetic fuel based on the minimum value of the oxygen concentration acquired from the oxygen concentration detection unit (oxygen sensor 113) that detects the oxygen concentration of the exhaust gas when the injection amount (injection pulse width) of the fuel injected by the fuel injection device (fuel injection device 200) is changed. The details of the process of calculating the theoretical air-fuel ratio are shown in FIG. 10 described later.

The valve closing delay time difference calculation unit (the valve closing delay time difference calculation unit 605) calculates, for each of a plurality of designated temperatures, a valve closing delay time taken until the valve closing is completed after the fuel injection device (the fuel injection device 200) in the valve open state starts to close, based on a plurality of valve closing times calculated at a plurality of different designated temperatures. Then, the valve closing delay time difference calculation unit (valve closing delay time difference calculation unit 605) normalizes the plurality of valve closing delay times calculated for each of the plurality of designated temperatures with the fuel pressure to calculate the difference between the plurality of valve closing delay times. For example, the valve closing delay time difference calculation unit 605 calculates the difference between the valve closing delay times (Tb−Te) obtained at a plurality of temperatures as the valve closing delay time difference ΔTdelay.

The content rate calculation unit (content rate calculation unit 606) calculates the synthetic fuel content rate α of the fuel contained in the fuel storage unit (fuel tank 123) based on characteristic data (see FIG. 8 to be described later) indicating the relationship between the valve closing delay time difference and the synthetic fuel content rate α of the synthetic fuel contained in the fuel. At this time, the content rate calculation unit 606 reads characteristic data from the storage unit 607. This characteristic data represents the relationship of the valve closing delay time difference ΔTdelay with respect to the mixed fuel temperature. In addition, the content rate calculation unit (content rate calculation unit 606) calculates the content rate of the gasoline, the alcohol, and the synthetic fuel contained in the fuel based on the theoretical air-fuel ratio and the valve closing delay time difference.

The storage unit 607 includes, for example, a random access memory (RAM) and a read only memory (ROM). The calculation result obtained by each unit of the fuel injection control device 127 is temporarily stored in the RAM and appropriately read. In addition, characteristic data is stored in advance in the ROM of the storage unit 607, and the characteristic data is read by the content rate calculation unit 606. The function of each unit of the fuel injection control device 127 is implemented by the CPU 501 configured in the ECU 109 loading a program code of software read from the ROM into the RAM and executing the program code. Therefore, the ROM is used as an example of a computer-readable non-transitory storage medium storing a program to be executed by the CPU 501.

Here, an example of a method of controlling the internal combustion engine 101 according to the present embodiment will be described with reference to FIG. 6.

Figure 6:
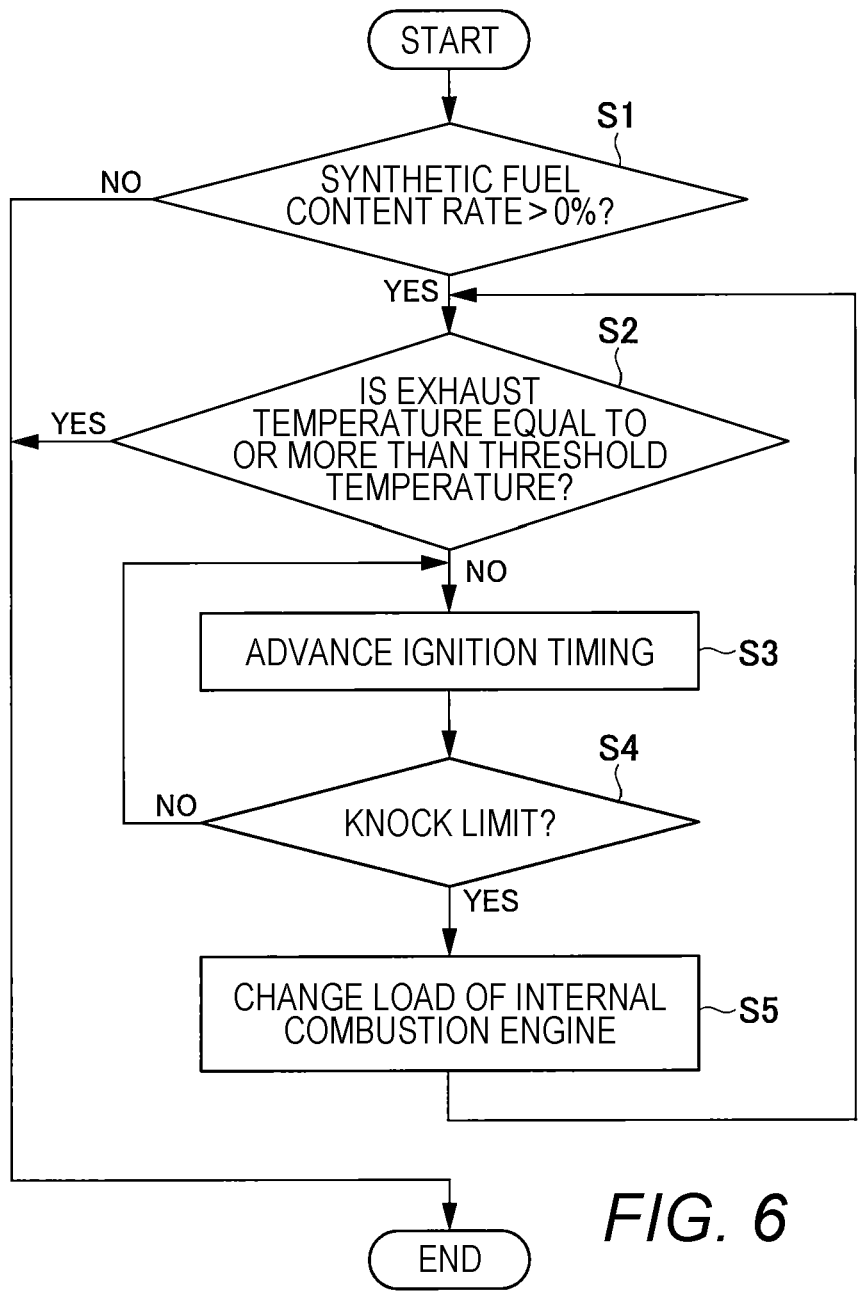
FIG. 6 is a flowchart illustrating an example of a method of controlling the internal combustion engine which is determined based on the synthetic fuel content rate according to the first embodiment of the present invention.

FIG. 6 is a flowchart illustrating an example of a method of controlling the internal combustion engine 101 determined on the basis of the synthetic fuel content rate x. The processing illustrated in FIG. 6 is started when the driver starts driving the vehicle, that is, when the internal combustion engine 101 starts driving.

When the synthetic fuel content rate α is greater than 0 and the exhaust temperature is less than the threshold temperature, the combustion control unit (combustion control unit 610) advances the ignition timing of the fuel supplied to the combustion chamber (combustion chamber 121) to the knock limit. Specifically, the combustion control unit 610 determines whether or not the content rate of the synthetic fuel to the fuel in the fuel tank 123 (hereinafter referred to as "synthetic fuel content rate α") exceeds 0% (S1). The process of calculating the synthetic fuel content rate α is executed by a flowchart illustrated in FIG. 7 described later.

The synthetic fuel content rate α is stored in the RAM of the storage unit 607 illustrated in FIG. 5. The synthetic fuel content rate α [%] is a value calculated by the following equation (1).

[Math 1]

$$\text{synthetic fuel content rate } \alpha \, [\%] = \frac{\text{weight of synthetic fuel}}{\text{weight of gasoline} * \text{weight of synthetic fuel}} \times 100 \quad (1)$$

When determining that the content rate α of the synthetic fuel does not exceed 0% (NO in S1), that is, the synthetic fuel is not included in the fuel, the combustion control unit 610 ends this process. Since the fuel tank 123 contains only gasoline, the combustion control unit 610 performs combustion control of the internal combustion engine 101 using only gasoline as fuel.

On the other hand, when the content rate α of the synthetic fuel exceeds 0% (YES in S1), that is, when the fuel contains the synthetic fuel other than gasoline, the combustion control unit 610 determines whether the exhaust temperature acquired from the sensors 105 illustrated in FIG. 5 is equal to or higher than the threshold temperature (S2).

When the exhaust gas temperature is equal to or higher than the threshold temperature (YES in S2), the combustion control unit 610 ends this processing.

On the other hand, when the exhaust gas temperature is lower than the threshold temperature (NO in S2), the combustion control unit 610 advances the ignition timing (S3). As the ignition timing advances, the combustion temperature of the fuel increases.

Next, the combustion control unit 610 determines whether the knock limit is reached based on the detection value of the knock sensor acquired from the sensors 105 (S4). When the knock limit is not reached (NO in S4), the combustion control unit 610 returns to step S3 and advances the ignition timing to the knock limit to increase the exhaust temperature.

When the exhaust temperature is equal to or lower than the threshold but the knock limit is reached (YES in S4), the combustion control unit 610 changes the load of the internal combustion engine 101 (S5) and performs control to increase the exhaust temperature to the threshold or higher. Therefore, the combustion control unit 610 performs the processing in step S2 and subsequent steps again.

As described above, the combustion control unit 610 controls the internal combustion engine 101 so that the exhaust temperature becomes equal to or higher than the desired threshold temperature when the synthetic fuel is included. By this control, the exhaust temperature becomes equal to or higher than the threshold temperature, and it is possible to reduce the amount of harmful components such as formaldehyde components that can be generated when combustion is performed using the synthetic fuel.

The synthetic fuel content rate α used for the determination in step S1 in FIG. 6 can be detected by the content rate calculation unit 606 of the ECU 109 based on the valve closing timing of the fuel injection device 200. As described above, the inflection point 330 illustrated in FIG. 4 is the valve closing timing. When the fuel in the fuel tank 123 changes (for example, a synthetic fuel is mixed into gasoline), the influence of the fuel change immediately appears as a change in valve closing timing. Therefore, as will be described later with reference to FIG. 7, the valve closing time calculation unit 603 detects the valve closing timing based on the extreme value of the time-series data of the drive voltage, whereby the content rate calculation unit 606 can accurately estimate the ratio of the synthetic fuel to the fuel supplied to the fuel tank 123 (the synthetic fuel content rate α).

In the present embodiment, the relationship between the synthetic fuel content rate α with respect to the fuel supplied to the fuel tank 123 and the valve closing timing, which is calculated by the content rate calculation unit 606, is recorded in the ROM of the storage unit 607. Then, the content rate calculation unit 606 reads the relationship between the synthetic fuel content rate α and the valve closing timing from the ROM and can obtain the synthetic fuel content rate α from the valve closing timing.

The fuel injection device 200 is provided for each cylinder of the internal combustion engine 101, and the characteristics (for example, the relationship between the valve closing timing and the synthetic fuel content rate α) of the fuel injection device 200 may be different for each cylinder. Therefore, in the characteristic data stored in the storage unit 607, the characteristic value of the fuel injection device 200 may be recorded for each cylinder. Alternatively, the fuel injection control device 127 can calculate the synthetic fuel content rate α by the following method illustrated in FIG. 7.

<Method for Calculating Synthetic Fuel Content Rate α>

Figure 7:
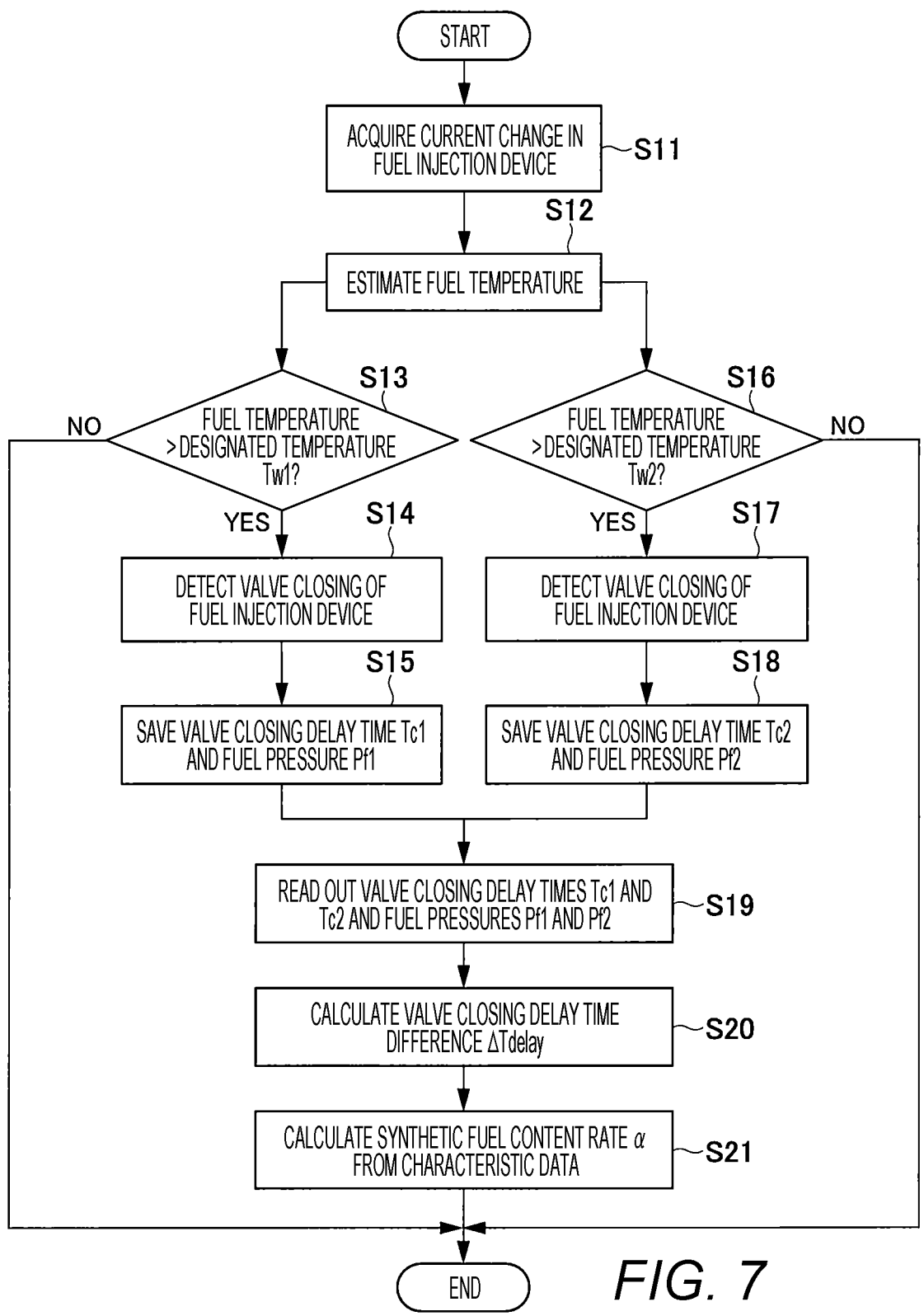
FIG. 7 is a flowchart illustrating an example of a synthetic fuel content rate estimation method according to the first embodiment of the present invention.

FIG. 7 is a flowchart illustrating an example of a method of calculating the composite fuel content rate α determined in step S1 in FIG. 6. The processing illustrated in FIG. 7 is executed while the internal combustion engine 101 is warmed, and the fuel temperature is increased. Therefore, the flowcharts in FIGS. 6 and 7 are executed separately.

First, the fuel temperature estimation unit 601 estimates a fuel temperature based on the current change of the fuel injection device 200 (S11). The current change of the fuel injection device 200 is used to estimate the temperature of the fuel injection device 200. For example, the fuel temperature estimation unit 601 monitors the drive current of the fuel injection device 200 at a predetermined time after a drive command pulse is input. In the following description, the temperature of the fuel injection device 200 is referred to as "fuel temperature".

As the warming of the internal combustion engine 101 progresses, when the heating resistance of the coil 208 (see FIG. 2) of the fuel injection device 200 increases, the slope of the drive current (the waveform of the peak current portion) illustrated in FIG. 4 changes from a peak current 308a to the peak current 308b. By using this principle, the fuel temperature estimation unit 601 can estimate the fuel temperature from the peak current (S12).

Next, the fuel temperature estimation unit 601 determines whether the fuel temperature exceeds a designated temperature Tw1 (S13). Here, the designated temperature Tw1 used in step S13 is a value lower than a designated temperature Tw2 used in step S16.

As the plurality of different designated temperatures, at least two temperatures are designated, including a temperature immediately after the start of the internal combustion engine (the internal combustion engine 101) and a temperature after the completion of warming up of the internal combustion engine (the internal combustion engine 101). The reason why at least two designated temperatures are set is that the viscosity of the fuel differs between a low temperature and a high temperature. Since the fuel immediately after the start of the internal combustion engine 101 has the lowest temperature and the highest viscosity, the movement of the valve body 201 is hindered by the resistance of the fuel, and the valve closing delay time tends to be long. On the other hand, since the fuel heated to about 80° C. has low viscosity, the resistance of the fuel decreases and the movement of the valve body 201 is hardly hindered, and the valve closing delay time tends to be shortened.

In the present embodiment, two different temperatures between 20° C. and 80° C. are used as the designated temperatures Tw1 and Tw2. For example, the designated temperature Tw1 is set to 30° C., and the designated temperature Tw2 is set to 70° C. Immediately after the start of the internal combustion engine 101, the fuel temperature rises due to warming even if the fuel temperature is substantially the same as the outside temperature. In addition, by setting at least two different temperatures between 20° C. and 80° C. to the designated temperature, the fuel always passes through the designated temperature as the fuel temperature rises.

The fuel temperature exceeding the designated temperature Tw1 is determined, for example, from the fact that the time T1 until the peak current illustrated in FIG. 4 reaches the current value Ip is equal to or longer than a threshold Th1. When the fuel temperature does not exceed the designated temperature Tw1 (NO in S13), the fuel temperature estimation unit 601 ends the processing. After a predetermined time, the processing in step S11 is performed again.

On the other hand, when the fuel temperature exceeds the designated temperature Tw1 (YES in S13), the valve closing time calculation unit 603 detects the valve closing of the fuel injection device 200 at the designated temperature Tw1 (S14).

Then, the fuel pressure acquisition unit 602 stores the value acquired from the fuel pressure sensor 126 at the designated temperature Tw1 in the RAM of the storage unit 607 as a fuel pressure Pf1. In addition, the valve closing time calculation unit 603 stores the value of the valve closing delay time (Tb−Te) illustrated in FIG. 4 based on the time Te during which the reverse voltage of the drive voltage is applied and the valve closing time Tb as the valve closing delay time Tc1 in the RAM of the storage unit 607 (S15).

After the fuel injection control device 127 acquires the valve closing delay time Tc1 at the designated temperature Tw1 in step S15, the combustion control unit 610 continues warming up the internal combustion engine 101 until the fuel temperature reaches the designated temperature Tw2. Meanwhile, the processing in steps S11, S12, and S16 is repeatedly performed.

The processing in steps S11 and S12 performed by the fuel temperature estimation unit 601 while warming up the internal combustion engine 101 is as described above. After step S12, the fuel temperature estimation unit 601 determines whether the fuel temperature exceeds the designated temperature Tw2 (S 16). The fuel temperature estimation unit 601 can determine that the fuel temperature exceeds the designated temperature Tw2 at the first injection time exceeding the time T2 until the drive current illustrated in FIG. 4 reaches the designated current value while the combustion control unit 610 continues warming up the internal combustion engine 101.

When the fuel temperature does not exceed the designated temperature Tw2 (NO in S 16), the fuel temperature estimation unit 601 ends this processing. After a predetermined time, the processing in step S11 is performed again.

On the other hand, when the fuel temperature exceeds the designated temperature Tw2 (YES in S16), the valve closing time calculation unit 603 detects the valve closing of the fuel injection device 200 at the designated temperature Tw2 (S17).

Then, the fuel pressure acquisition unit 602 stores the value acquired from the fuel pressure sensor 126 at the designated temperature Tw2 in the RAM of the storage unit 607 as a fuel pressure Pf2. In addition, the valve closing time calculation unit 603 stores the value of the valve closing delay time (Tb−Te) illustrated in FIG. 4 based on the time Te during which the reverse voltage of the drive voltage is applied and the valve closing time Tb as the valve closing delay time Tc2 in the RAM of the storage unit 607 (S18).

After step S18, the valve closing delay time difference calculation unit 605 reads the valve closing delay time Tc1 and the fuel pressure Pf1 at the designated temperature Tw1 and the valve closing delay time Tc2 and the fuel pressure Pf2 at the designated temperature Tw2 from the RAM (S19).

Then, the valve closing delay time difference calculation unit (valve closing delay time difference calculation unit 605) normalizes the plurality of valve closing delay times calculated for each of the plurality of designated temperatures with the fuel pressure to calculate the difference between the plurality of valve closing delay times ΔTdelay (S20). For example, the valve closing delay time difference calculation unit 605 normalizes the valve closing delay times Tc1 and Tc2 at the designated temperatures Tw1 and Tw2 with the fuel pressures Pf1 and Pf2 to calculate the valve closing delay time difference ΔTdelay (S20) and stores the valve closing delay time difference ΔTdelay in the RAM of the storage unit 607. Here, the process of normalizing the valve closing delay times with the fuel pressures is, for example, a process of converting the valve closing delay times Tc1 and Tc2 into the valve closing delay times when the fuel pressures Pf1 and Pf2 are the same value. Even at the same fuel pressure, the valve closing delay time varies when the properties of the fuel are different. Therefore, since the valve closing delay time difference ΔTdelay is also different for each of different fuel properties, it is possible to specify a fuel property from the valve closing delay time difference ΔTdelay.

After step S20, the content rate calculation unit 606 estimates the synthetic fuel content rate α using the valve closing delay time difference ΔTdelay read from the RAM and the characteristic data stored in the storage unit 607 (the relationship illustrated in FIG. 8 to be described later) (S21) and ends this processing.

Figure 8:
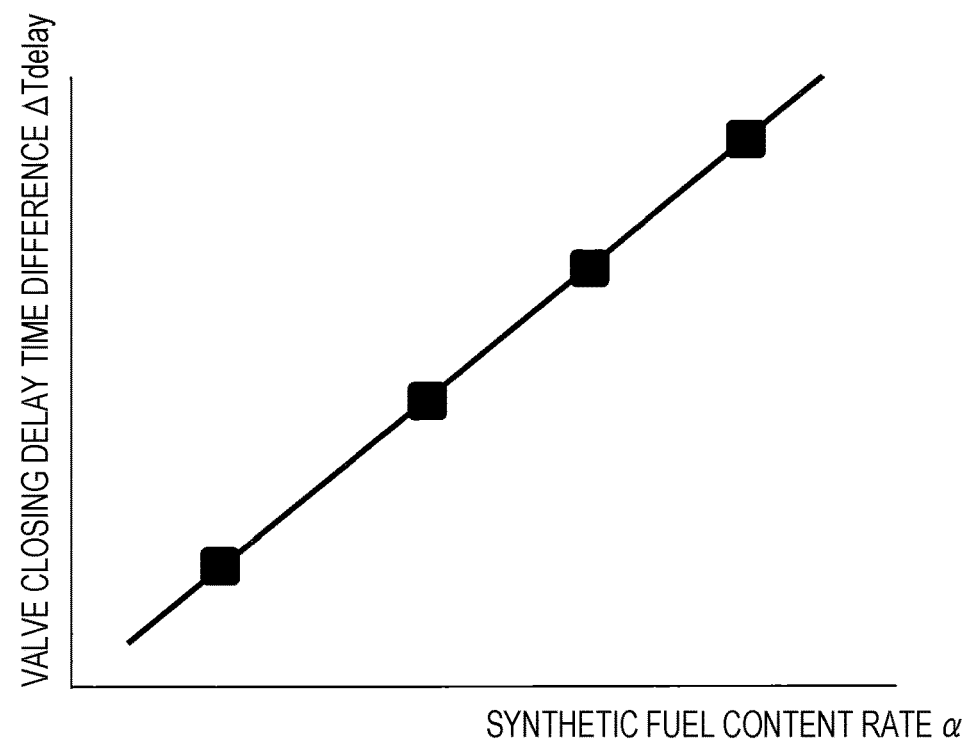
FIG. 8 is a graph showing an example of characteristic data indicating the relationship between the synthetic fuel content rate and the valve closing delay time difference according to the first embodiment of the present invention.

FIG. 8 is an example of characteristic data indicating the relationship between the synthetic fuel content rate α and the valve closing delay time difference ΔTdelay.

Referring to FIG. 8, the horizontal axis represents the synthetic fuel content rate α, and the vertical axis represents the valve closing delay time difference ΔTdelay. The plurality of square points attached to the graph represent values of valve closing delay time differences read from the RAM.

As shown in FIG. 8, there is a linear relationship between the valve closing delay time difference ΔTdelay and the synthetic fuel content rate α. That is, it can be seen that the synthetic fuel content rate α tends to increase as the valve closing delay time difference ΔTdelay increases. Therefore, in step S21 in FIG. 7, the synthetic fuel content rate α can be estimated from the valve closing delay time difference ΔT by using the conversion equation obtained from the characteristic data shown in FIG. 8 read from the storage unit 607 by the content rate calculation unit 606.

Figure 9:
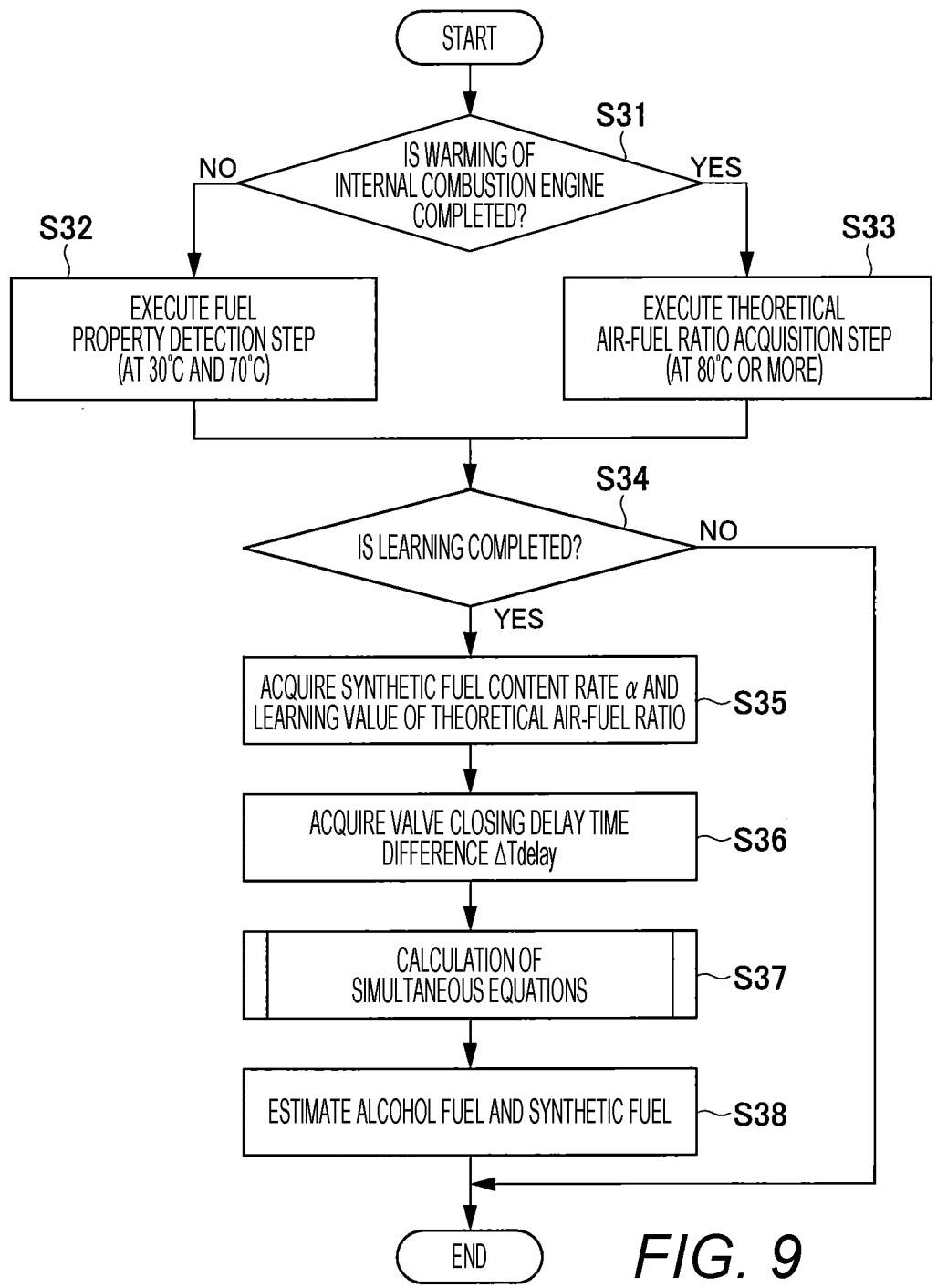
FIG. 9 is a flowchart showing a method for estimating the content rates of alcohol fuel and synthetic fuel contained in gasoline according to the first embodiment of the present invention.

FIG. 9 is a flowchart illustrating a method for estimating the content rates of alcohol fuel and synthetic fuel contained in gasoline.

The following will describe a method in which the fuel injection control device 127 estimates the content rate of alcohol fuel contained in gasoline and the content rate of synthetic fuel when the gasoline contains the mixed fuel obtained by mixing the synthetic fuel and the alcohol fuel.

In the present embodiment, even when performance variation has occurred in the fuel injection device 200 for each cylinder, the content rates of the alcohol fuel and the synthetic fuel can be estimated without using a specific value recorded in the ROM for each cylinder.

First, the fuel temperature estimation unit 601 determines whether the warm-up of the internal combustion engine 101 is completed based on the temperature of the cooling water acquired from the water temperature sensor 108 (S31).

When the fuel temperature estimation unit 601 determines that the warm-up of the internal combustion engine 101 is not completed (NO in S31), the fuel injection control device 127 executes the fuel property detection step using the fuel injection device 200 (S32). In the present specification, an index for distinguishing gasoline, synthetic fuel, and alcohol fuel contained in fuel is referred to as "fuel property". This fuel property detecting step is processing performed, for example, when the fuel temperature is 30° C. and 70° C. in accordance with the warm-up of the internal combustion engine 101 and is executed similarly to the estimation processing of the synthetic fuel content rate α illustrated in FIG. 7. In this fuel property detecting step, the synthetic fuel content rate α is calculated as the fuel property of the fuel in the fuel tank 123. The calculated synthetic fuel content rate α is stored in the RAM of the storage unit 607. When the fuel property is detected, the warm-up completion determination in step S31 is performed again.

When the fuel temperature estimation unit 601 determines that the warm-up is completed in step S31 (YES in S31), the theoretical air-fuel ratio calculation unit 604 executes a theoretical air-fuel ratio acquisition step (S33). This theoretical air-fuel ratio acquisition step is, for example, processing performed when the fuel temperature is 80° C. Here, processing in which the theoretical air-fuel ratio calculation unit 604 acquires the theoretical air-fuel ratio will be described with reference to FIG. 10.

FIG. 10 is a diagram illustrating a relationship of the oxygen concentration with respect to the air-fuel ratio.

Referring to FIG. 10, the horizontal axis represents the air-fuel ratio, and the vertical axis represents the oxygen concentration. The oxygen concentration with respect to the air-fuel ratio is represented by, for example, a downwardly convex quadratic curve.

In the step in which the theoretical air-fuel ratio calculation unit 604 acquires a theoretical air-fuel ratio, the combustion control unit 610 changes the drive command pulse Ti of the fuel injection device 200 to change the concentration (air-fuel ratio) of the fuel injected into the combustion chamber. Then, the oxygen sensor 113 detects the oxygen concentration in the exhaust gas every time the drive command pulse Ti changes. The plurality of square points attached to the graph of FIG. 10 represent the oxygen concentration detected for each change in the drive command pulse Ti.

The theoretical air-fuel ratio calculation unit 604 searches for the drive command pulse width when the oxygen concentration obtained by the combustion control unit 610 changing the drive command pulse width Ti becomes the minimum value. The process of searching for a drive command pulse width in this manner is referred to as learning. Then, when the search for the drive command pulse width at the time when the oxygen concentration becomes the minimum value is completed, the theoretical air-fuel ratio calculation unit 604 acquires the ratio of the fuel and the air injected into the combustion chamber 121 with the drive command pulse width at the time when the oxygen concentration becomes the minimum value as a theoretical air-fuel ratio and stores the ratio in the RAM of the storage unit 607.

Returning to FIG. 9 again, the description will be continued.

After steps S32 and S33, the content rate calculation unit 606 determines whether or not the learning in the theoretical air-fuel ratio acquisition step has been completed (S34). The content rate calculation unit 606 determines that the learning is completed when the fuel temperature exceeds at least the two designated temperatures Tw1 and Tw2 and exceeds a temperature (for example, a set temperature of 80° C. or higher) at which the theoretical air-fuel ratio can be acquired. When determining that the learning is not completed (NO in S34), the content rate calculation unit 606 ends the present processing. Then, after a predetermined time, the content rate calculation unit 606 performs the processing in S31 and S33 again.

On the other hand, when the content rate calculation unit 606 determines that the learning is completed (YES in S34), the synthetic fuel content rate α calculated in step S32 is acquired from the RAM of the storage unit 607, and the learning value of the theoretical air-fuel ratio acquired in step S33 is read from the RAM of the storage unit 607 (S35). Next, the content rate calculation unit 606 reads and acquires the valve closing delay time difference ΔTdelay detected in step S32 from the RAM (S36).

The content rate calculation unit 606 calculates simultaneous equations to be described later with reference to FIG. 11 (S37) to obtain the synthetic fuel content rate α, an alcohol fuel content rate β, and a gasoline content rate (1-α-β) as unknown values using the valve closing delay time difference ΔTdelay and the theoretical air-fuel ratio.

Figure 11:
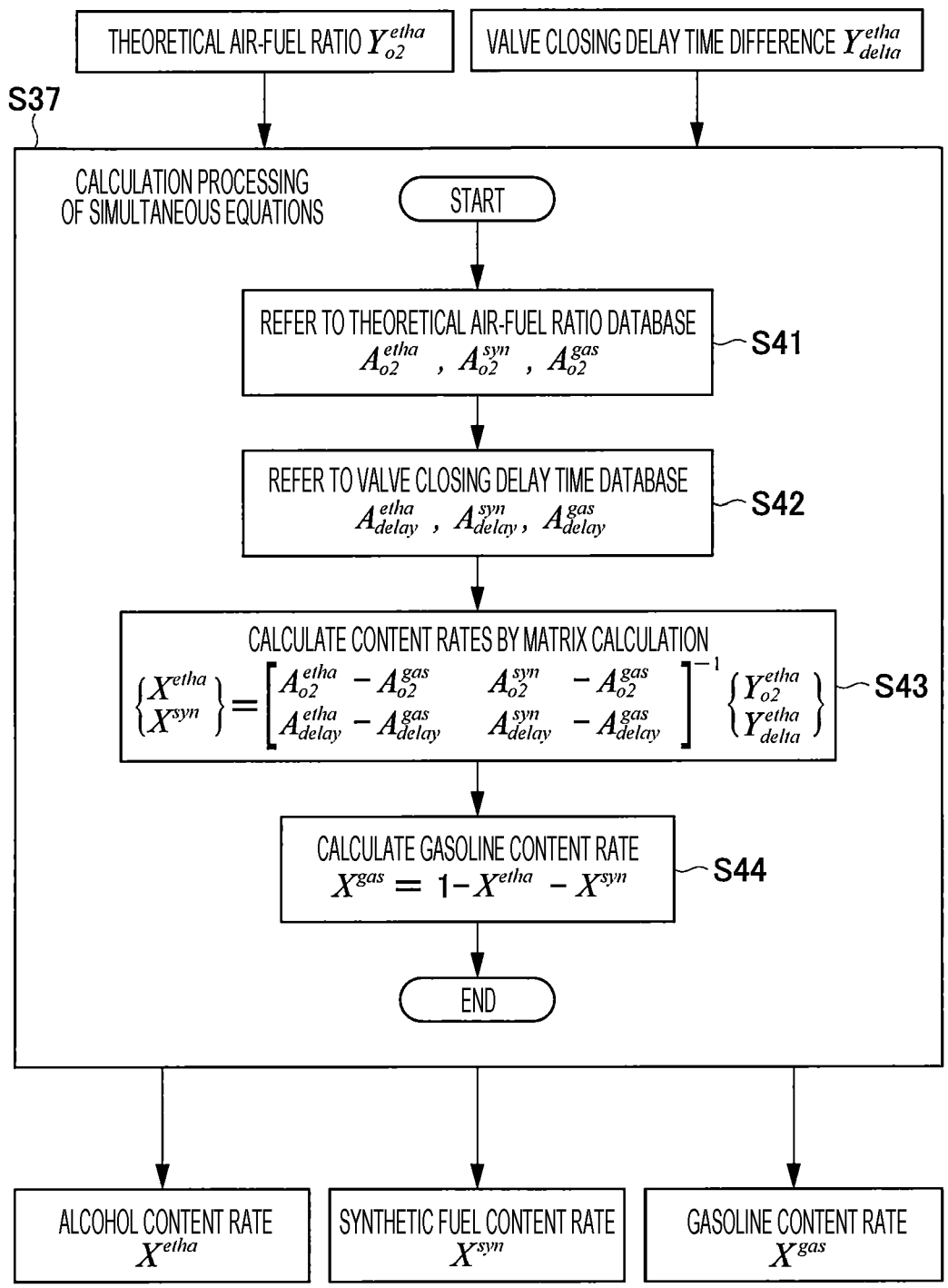
FIG. 11 is a flowchart illustrating an example of calculation processing of simultaneous equations illustrated in step S37 in FIG. 9.

FIG. 11 is a flowchart illustrating an example of calculation processing of simultaneous equations illustrated in step S37 in FIG. 9.

In this processing, the learning value of the theoretical air-fuel ratio read in step S35 in FIG. 9 and the valve closing delay time difference ΔTdelay acquired in step S36 are input. Data Y illustrated in FIG. 11 represents an input value, and the learning value of a theoretical air-fuel ratio and the valve closing delay time difference ΔTdelay are input. "o2" representing the theoretical air-fuel ratio is attached to the lower right of data Y representing the theoretical air-fuel ratio described in the upper left of FIG. 11, and "etha" representing alcohol is attached to the upper right of data Y. In addition, "delta" representing a valve closing delay time difference is attached to the lower right of data Y representing the difference in the valve closing delay time described in the upper right of FIG. 11, and "etha" representing alcohol is attached to the upper right of data Y.

First, the content rate calculation unit 606 refers to the theoretical air-fuel ratio database stored in the ROM and acquires the data of the theoretical air-fuel ratio used for the calculation in step S43 for each of alcohol, synthetic fuel, and gasoline (S41). In FIG. 11, "o2" representing a theoretical air-fuel ratio is attached to the lower right of data A, and "etha" representing alcohol, "syn" representing synthetic fuel, and "gas" representing gasoline are attached to the upper right of data A as the types of data.

Next, the content rate calculation unit 606 refers to the valve closing delay time database stored in the ROM and acquires the data of the valve closing delay time used for the calculation in step S43 (S42). In FIG. 11, "delay" representing the valve closing delay time is attached to the lower right of data A, and "etha" representing alcohol, "syn" representing synthetic fuel, and "gas" representing gasoline are attached to the upper right of data A as the types of data.

Next, the content rate calculation unit 606 calculates the content rates of alcohol and synthetic fuel by matrix calculation using the following equation (2) (S43). Here, data X on the left side of equation (2) represents the content rates of alcohol and synthetic fuel and is the value calculated by the operation on the right side of equation (2). In addition, "etha" representing alcohol and "syn" representing synthetic fuel are attached to the upper right of data X as the types of data. Data Y of equation (2) is the value input at the start of step S41 as described above.

[Math 2]

$$\begin{Bmatrix} X^{etha} \\ X^{syn} \end{Bmatrix} = \begin{bmatrix} A^{etha}_{o2} - A^{gas}_{o2} & A^{syn}_{o2} - A^{gas}_{o2} \\ A^{etha}_{delay} - A^{gas}_{delay} & A^{syn}_{delay} - A^{gas}_{delay} \end{bmatrix}^{-1} \begin{Bmatrix} Y^{etha}_{o2} \\ Y^{etha}_{delta} \end{Bmatrix} \quad (2)$$

Next, the content rate calculation unit 606 substitutes the content rates of the alcohol and the synthetic fuel obtained by the calculation of equation (2) into following equation (3) to calculate the content rate of the gasoline contained in the fuel (S44). The content rate of gasoline is represented by data X with "gas" representing gasoline on the upper right.

Data X included in the right side of equation (3) corresponds to the gasoline content rate (1-α-β), the alcohol fuel content rate β, and the synthetic fuel content rate α described above.

[Math 3]

$$X^{gas} = 1 - X^{etha} - X^{syn} \quad (3)$$

The content rate calculation unit 606 obtains the alcohol fuel content rate, the synthetic fuel content rate, and the gasoline content rate through the processing in step S44 and leads to the processing in step S38 of FIG. 9.

The content rate calculation unit 606 can calculate three types of content rates, namely an alcohol fuel content rate, a synthetic fuel content rate, and a gasoline content rate by using simultaneous equations in step S37. Then, the content rate calculation unit 606 estimates the amounts of alcohol fuel and synthetic fuel contained in the fuel based on the alcohol fuel content rate, the synthetic fuel content rate, and the gasoline content rate (S38) and ends the present processing.

After step S38, the combustion control unit 610 advances the ignition timing based on the estimated values of the amounts of gasoline, alcohol fuel, and synthetic fuel contained in the fuel so as to achieve an optimum ignition timing at which no harmful component is generated in the exhaust gas, thus controlling the combustion of the internal combustion engine 101.

The fuel injection control device 127 according to the first embodiment described above calculates a valve closing delay time difference based on the valve closing delay time and the fuel pressure acquired for each of at least two different designated temperatures Tw1 and Tw2 and calculates the synthetic fuel content rate α of the synthetic fuel contained in the gasoline. Therefore, the combustion control unit 610 can appropriately control the combustion of the internal combustion engine 101 based on the synthetic fuel content rate α accurately estimated by the fuel injection control device 127. As described above, by controlling the combustion so that the exhaust temperature becomes equal to or higher than the predetermined value according to the presence or absence of synthetic fuel, the generation of harmful components such as formaldehyde can be suppressed, and the exhaust gas can be cleaned.

When the fuel temperature reaches two or more different designated temperatures, the valve closing time is calculated for each designated temperature, and the valve closing delay time difference ΔTdelay is obtained. Therefore, the influence of the variation in valve closing time due to the individual differences among fuel injection devices 200 can be eliminated.

When the gasoline contains alcohol fuel and synthetic fuel, the alcohol fuel and the synthetic fuel can be estimated by substituting the synthetic fuel content rate α acquired after the completion of engine warm-up, the learning value of a theoretical air-fuel ratio, and a valve closing delay time difference into the simultaneous equations of equation (2). Even if the three types of fuels are mixed as described above, the fuel injection control device 127 can grasp at what ratio each fuel is included. Therefore, the combustion control unit 610 can appropriately control the combustion of the internal combustion engine 101 based on the content rates of the three types of fuels accurately estimated by the fuel injection control device 127.

Second Embodiment

Next, a configuration example and an operation example of a fuel injection control device according to the second embodiment of the present invention will be described with reference to FIGS. 12 to 14.

There are differences in the frequency of driving vehicles among drivers. For example, some driver drives a vehicle every day, and another driver drives a vehicle only every week or every month. However, the fuel remaining in a fuel tank 123 is likely to deteriorate over time such as oxidation. Accordingly, performing the process of calculating a synthetic fuel content rate α of the fuel that has entered the fuel tank 123 and estimating the content rates of alcohol fuel and gasoline only at the time of driving, that is, driving an internal combustion engine 101 may obtain an inaccurate value due to the influence of aging deterioration. For this reason, the fuel injection control device according to the second embodiment performs the process of calculating an alcohol fuel content rate, a synthetic fuel content rate, and a gasoline content rate of fuel at the time of fuel supply.

Figure 12:
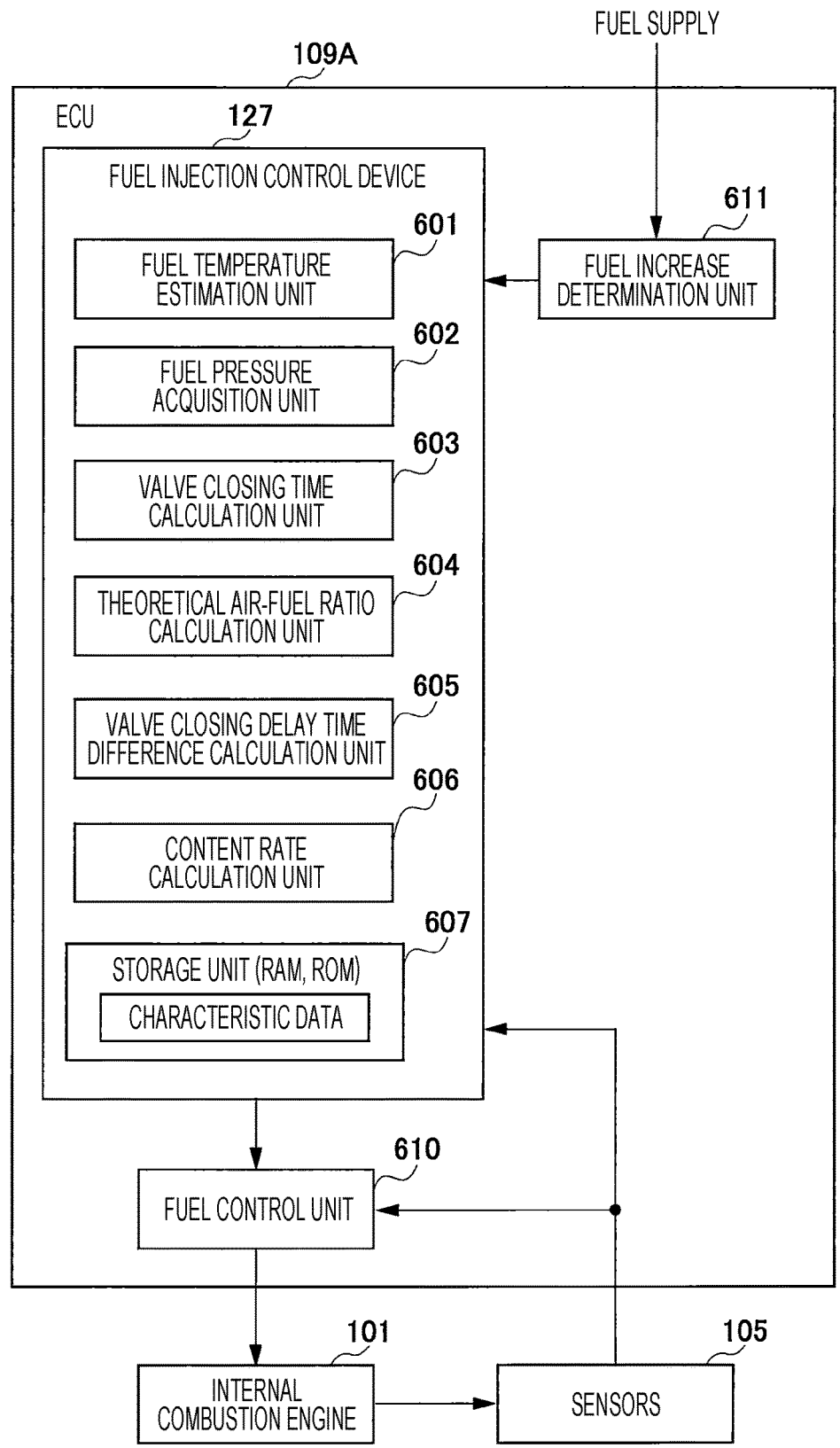
FIG. 12 is a block diagram illustrating a functional configuration example of an ECU and a fuel injection control device according to a second embodiment of the present invention.

FIG. 12 is a block diagram illustrating a functional configuration example of an ECU 109A according to the second embodiment.

The ECU 109A includes a fuel increase determination unit 611 in addition to the fuel injection control device 127 and the combustion control unit 610 illustrated in FIG. 5.

The fuel increase determination unit (the fuel increase determination unit 611) determines that the fuel stored in the fuel storage unit (the fuel tank 123) has increased. For example, the fuel increase determination unit 611 detects that fuel has been supplied into the fuel tank 123, that is, an increase in fuel in the fuel tank 123, based on an output signal output from a fuel level sensor 99 (see FIG. 1) due to fuel supply. Upon detecting an increase in fuel, the fuel increase determination unit 611 outputs information (to be referred to as a "fuel increase determination result" hereinafter) including fuel increase detection and the fuel increase amount to the fuel injection control device 127.

When a fuel increase determination result is input from the fuel increase determination unit 611, the fuel injection control device 127 starts the processing illustrated in FIG. 14 to be described later. Then, when the fuel increase determination unit (the fuel increase determination unit 611) determines that the fuel has increased, the content rate calculation unit (the content rate calculation unit 606) calculates the oil content rates of gasoline, alcohol, and synthetic fuel contained in the fuel.

Figure 13:
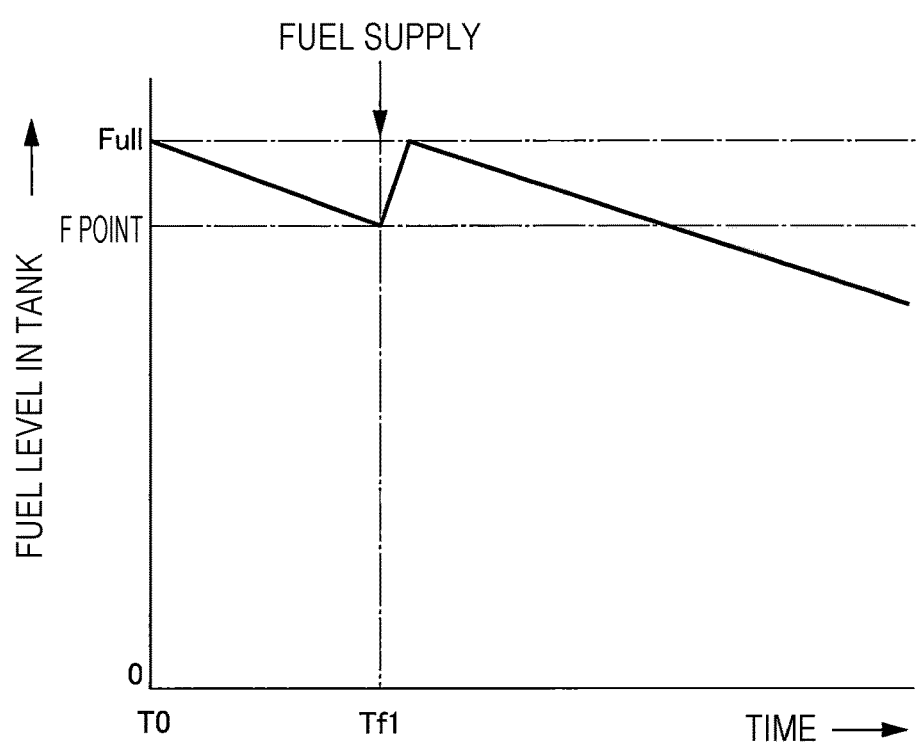
FIG. 13 is a graph illustrating an example of time-series data of a fuel level in a tank output by a fuel level sensor according to the second embodiment of the present invention.

FIG. 13 is a diagram illustrating an example of time-series data of the in-tank fuel level output by the fuel level sensor 99. Referring to FIG. 13, the horizontal axis represents the time, and the vertical axis represents the in-tank fuel level.

At time T0, the in-tank fuel level is in a capacity limit state (Full). Thereafter, the in-tank fuel level decreases with the lapse of time. Factors of lowering the in-tank fuel level include, for example, traveling of the vehicle and evaporation due to being left undriven for a long period of time. When the in-tank fuel level decreases to a point F where fuel supply is required, the driver supplies fuel to the fuel tank 123. The fuel level in the tank rises from the point F to Full in a short time from time Tf1 when the driver supplies fuel. This means that the amount of fuel supplied to the fuel tank 123 has increased.

As described above, when the slope of the straight line from the point F of the in-tank fuel level to Full at time Tf1 (the increase value of fuel per hour) is larger than a predetermined value, the fuel increase determination unit 611 illustrated in FIG. 5 determines that fuel has been supplied. Then, the fuel increase determination unit 611 outputs a determination result of the fuel increase to a fuel injection control device 127A. Upon receiving the fuel increase determination result, the fuel injection control device 127A starts the process of estimating the content rate of gasoline shown in FIG. 14.

Figure 14:
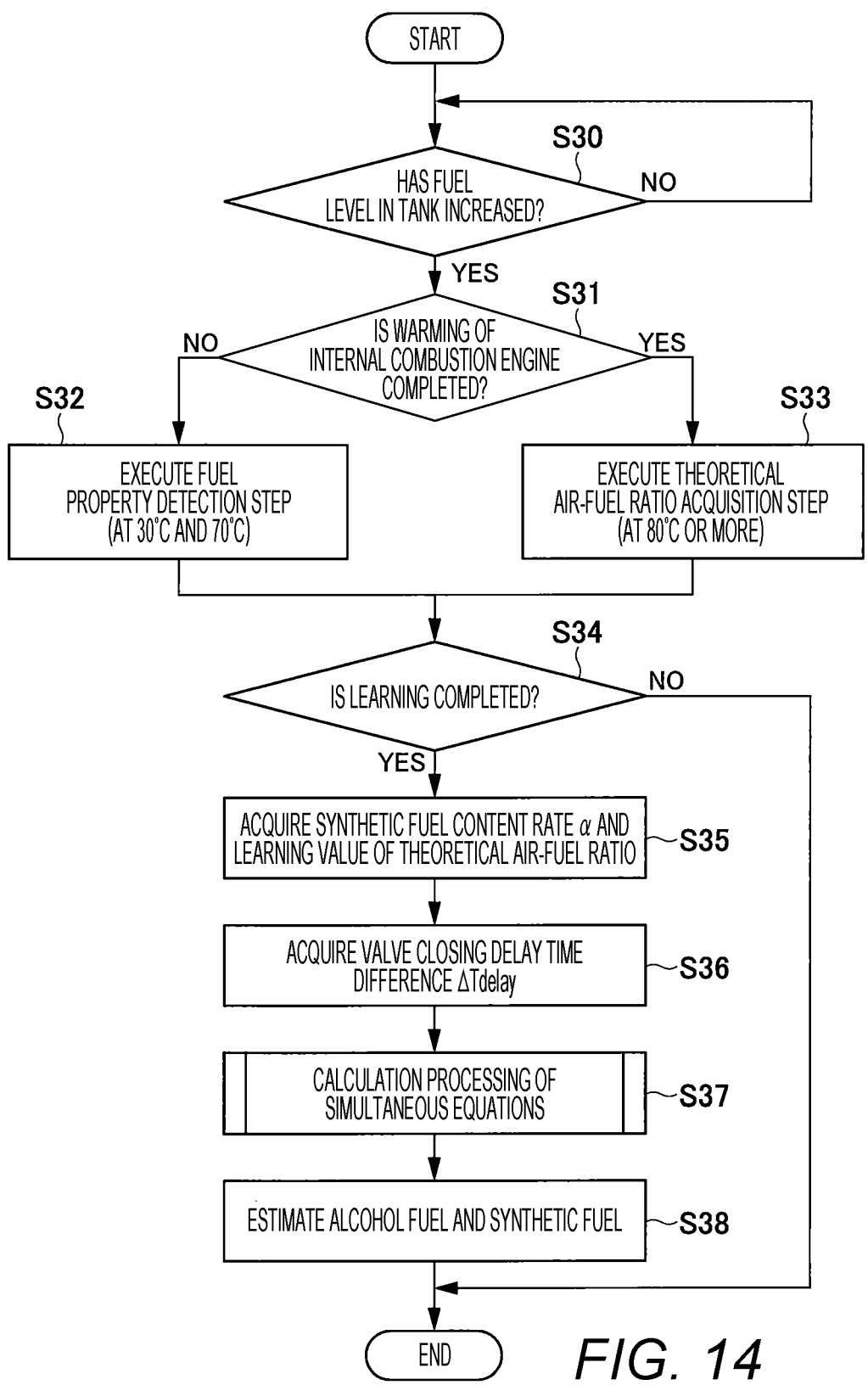
FIG. 14 is a flowchart illustrating a method for estimating the content rates of alcohol fuel and synthetic fuel when the fuel level in the tank increases according to the second embodiment of the present invention.

FIG. 14 is a flowchart illustrating a method of estimating the content rates of alcohol fuel and synthetic fuel when the in-tank fuel level increases.

First, a fuel temperature estimation unit 601 determines whether the in-tank fuel level has increased (S30). If no fuel increase determination result is input from the fuel increase determination unit 611 to the fuel temperature estimation unit 601, the in-tank fuel level does not increase (NO in S30), and hence the processing in step S30 is repeated.

In contrast to this, if a fuel increase determination result is input from the fuel increase determination unit 611 to the fuel temperature estimation unit 601, the in-tank fuel level is increased (YES in S30), and hence the processing in and after step S31 is performed. Since the processing after step S31 is the same as the processing of the flowchart already described with reference to FIG. 9, a detailed description thereof will be omitted.

Since the processing of estimating the content rates of alcohol fuel and synthetic fuel is performed only when the in-tank fuel level increases as described above, it is possible to eliminate erroneous detection of the alcohol fuel content rate, the synthetic fuel content rate, and the gasoline content rate of the fuel that has deteriorated over time while remaining in the fuel tank 123. Therefore, an ECU 109 can control the internal combustion engine 101 while minimizing the influence on the calculation processing of the content rate due to the aged deterioration of the fuel and suppressing the generation of harmful components.

The fuel increase determination unit 611 may be provided in the fuel injection control device 127.

[Modification]

In each of the above-described embodiments, the full lift control of a valve body 201 has been described as an example of the fuel injection control. However, in the fuel injection control according to the present invention, the valve body 201 may be subjected to half lift control.

In each of the embodiments described above, fuel properties are detected at two designated temperatures, but fuel properties may be detected by setting three or more designated temperatures. For example, when three designated temperatures are set, two valve closing delay time differences ΔTdelay can be calculated. Therefore, an average value of the two valve closing delay time differences ΔTdelay may be calculated, and the average value may be used for the processing shown in step S37 of FIG. 11. In addition, a plurality of valve closing delay time differences ΔTdelay may be calculated, and one valve closing delay time difference ΔTdelay may be determined by majority decision.

In addition, the ECU 109 and the fuel injection control device 127 according to each of the above-described embodiments may be used for controlling the internal combustion engine mounted on not only a vehicle but also a railway, a construction machine, a generator, and the like.

Although a fuel injection device 200 according to each of the above-described embodiments is a direct injection type fuel injection device that directly injects fuel into a combustion chamber 121, the fuel injection device may be a port type fuel injection device that injects fuel into an intake pipe 110. In addition, the fuel injection control device 127 may be able to calculate the synthetic fuel content rate of the fuel by detecting the valve opening characteristic instead of the valve closing characteristic of the fuel injection device 200.

Note that the present invention is not limited to the embodiments described above, and it is obvious that various other application examples and modifications can be taken without departing from the gist of the present invention described in the claims.

For example, the above-described embodiments describe the configuration of the device in detail and specifically in order to describe the present invention in an easy-to-understand manner, and are not necessarily limited to those having all the described configurations. Moreover, it is possible to add, delete, and replace other configurations with respect to part of the configurations of this embodiment.

In addition, the control lines and the information lines indicate what is considered to be necessary for the description, and do not necessarily indicate all the control lines and the information lines in terms of products. In practice, it may be considered that almost all the configurations are connected to each other.

REFERENCE SIGNS LIST

101 internal combustion engine
109 ECU
123 fuel tank
127 fuel injection control device
200 fuel injection device
601 fuel temperature estimation unit
602 fuel pressure acquisition unit
603 valve closing time calculation unit
604 theoretical air-fuel ratio calculation unit
605 time difference calculation unit
606 content rate calculation unit
607 storage unit
610 combustion control unit
611 fuel increase determination unit

The invention claimed is:

1. An internal combustion engine control device comprising an engine control unit, the engine control unit configured to:
   estimate a fuel temperature of fuel supplied to a combustion chamber;
   acquire a fuel pressure at which a fuel injection device injects the fuel;
   detect that the fuel injection device is closed when the fuel temperature reaches a designated temperature and calculate a valve closing time of the fuel injection device;
   calculate a valve closing delay time taken from start of valve closing to completion of the valve closing by the fuel injection device in a valve opening state for each of the plurality of designated temperatures based on a plurality of valve closing times calculated at a plurality of different designated temperatures, normalize the plurality of valve closing delay times calculated for each of the plurality of designated temperatures with the fuel pressure, and calculate a difference between the valve closing delay times;
   calculate a synthetic fuel content rate of the fuel stored in a fuel storage unit based on characteristic data indicating a relationship between the difference between the valve closing delay times and the synthetic fuel content rate of the synthetic fuel contained in the fuel; and
   control an internal combustion engine such that an exhaust temperature of an exhaust gas discharged from the combustion chamber becomes not less than a threshold temperature based on the synthetic fuel content rate.

2. The internal combustion engine control device according to claim 1, wherein the fuel temperature is estimated based on a waveform of a drive current for driving the fuel injection device in which resistance of a coil changes with a change in the fuel temperature.

3. The internal combustion engine control device according to claim 2, wherein the engine control unit advances an ignition timing of the fuel supplied to the combustion chamber to a knock limit when the synthetic fuel content rate is greater than zero and the exhaust temperature is less than the threshold temperature.

4. The internal combustion engine control device according to claim 3, wherein
   the fuel injection device is a direct injection type fuel injection device that directly injects the fuel into the combustion chamber,
   the engine control unit further calculates a theoretical air-fuel ratio at a time of combustion of the fuel containing the synthetic fuel based on a minimum value of the oxygen concentration acquired from an oxygen concentration detector that detects an oxygen concentration of the exhaust gas when an injection amount of the fuel injected by the fuel injection device is changed, and
   the engine control unit calculates content rates of gasoline, alcohol, and synthetic fuel contained in the fuel based on the theoretical air-fuel ratio and a difference between the valve closing delay times.

5. The internal combustion engine control device according to claim 3, wherein the engine control unit further
   determines that the amount of fuel stored in the fuel storage unit has increased,
   wherein the engine control unit calculates content rates of gasoline, alcohol, and synthetic fuel contained in the fuel when the engine control unit determines that the fuel has increased.

6. The internal combustion engine control device according to claim 1, wherein at least two temperatures including a temperature immediately after activation of the internal combustion engine and a temperature after completion of warming of the internal combustion engine are designated as the plurality of different designated temperatures.

* * * * *